United States Patent
Hosseini et al.

(10) Patent No.: US 10,652,894 B2
(45) Date of Patent: May 12, 2020

(54) TIMING ADVANCE REPORTING FOR LATENCY REDUCTION

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/807,881

(22) Filed: Nov. 9, 2017

(65) Prior Publication Data

US 2018/0139747 A1 May 17, 2018

Related U.S. Application Data

(60) Provisional application No. 62/421,208, filed on Nov. 11, 2016.

(51) Int. Cl.
| | |
|---|---|
| *H04W 56/00* | (2009.01) |
| *H04W 72/04* | (2009.01) |
| *H04W 72/08* | (2009.01) |

(52) U.S. Cl.
CPC ....... *H04W 72/048* (2013.01); *H04W 56/001* (2013.01); *H04W 56/0045* (2013.01);
(Continued)

(58) Field of Classification Search
CPC ........... H04W 56/001; H04W 56/0045; H04W 56/006; H04W 72/0413; H04W 72/0446; H04W 72/048; H04W 72/085
See application file for complete search history.

(56) References Cited

U.S. PATENT DOCUMENTS 8,526,389 B2 * 9/2013 Dinan ................. H04W 52/281
370/329
8,743,748 B2 * 6/2014 Pan ................... H04W 56/0045
370/280
(Continued)

FOREIGN PATENT DOCUMENTS

| EP | 2876964 A1 | 5/2015 |
| WO | WO-2012041422 A2 | 4/2012 |

OTHER PUBLICATIONS

International Search Report and Written Opinion—PCT/US2017/061161—ISA/EPO—dated Feb. 12, 2018.

*Primary Examiner* — Alpus Hsu
(74) *Attorney, Agent, or Firm* — Thien T. Nguyen

(57) ABSTRACT

Methods, systems, and devices for wireless communication are described. A user equipment (UE) and a base station may communicate according to a timing configuration that includes a time delay between uplink and downlink communications. The time delay may be based on UE capabilities, scheduling in the system, and an uplink timing advance. The UE may determine an uplink timing advance and transmit an indication of the uplink timing advance to the base station. Using the uplink timing advance, the base station may determine a timing configuration to use for communicating with the UE. The timing configuration may be dynamically configured based on the value of the uplink timing advance with respect to a timing advance threshold and may be shortened or lengthened depending on whether the uplink timing advance crosses the timing advance threshold. Multiple timing advance thresholds may be used, and a timing configuration may be selected accordingly.

32 Claims, 17 Drawing Sheets

(52) U.S. Cl.
CPC ... *H04W 72/0413* (2013.01); *H04W 72/0446* (2013.01); *H04W 72/085* (2013.01); *H04W 56/006* (2013.01)

(56) References Cited

U.S. PATENT DOCUMENTS

| | | | | |
|---|---|---|---|---|
| 8,743,787 B2* | 6/2014 | Bostrom | | H04L 5/0051 370/328 |
| 8,804,684 B2* | 8/2014 | Persson | | H04W 56/0045 370/328 |
| 8,831,034 B2* | 9/2014 | Tynderfeldt | | H04W 56/0045 370/232 |
| 9,042,925 B2* | 5/2015 | Seo | | H04W 56/00 455/408 |
| 9,210,676 B2* | 12/2015 | Dinan | | H04W 56/0005 |
| 9,215,686 B2* | 12/2015 | Kazmi | | H04B 17/27 |
| 9,282,521 B2* | 3/2016 | Lim | | H04W 52/146 |
| 9,344,985 B2* | 5/2016 | Loehr | | H04W 56/0005 |
| 9,357,536 B2* | 5/2016 | Park | | H04W 56/0045 |
| 9,402,255 B2* | 7/2016 | Lohr | | H04W 72/0446 |
| 9,578,629 B2* | 2/2017 | Lee | | H04W 56/0045 |
| 9,749,927 B2* | 8/2017 | Lohr | | H04W 72/0446 |
| 9,973,297 B2* | 5/2018 | Marinier | | H04L 1/0003 |
| 9,999,018 B2* | 6/2018 | Etemad | | H04W 76/27 |
| 10,117,208 B2* | 10/2018 | Seo | | H04W 56/0045 |
| 10,355,761 B2* | 7/2019 | Chen | | H04W 56/0045 |
| 2010/0020786 A1* | 1/2010 | Futaki | | H04W 56/0005 370/350 |
| 2012/0269172 A1* | 10/2012 | Chin | | H04W 36/32 370/332 |
| 2013/0100938 A1* | 4/2013 | Kwon | | H04L 27/2655 370/336 |
| 2014/0119206 A1* | 5/2014 | Vargantwar | | H04W 56/00 370/252 |
| 2015/0245307 A1* | 8/2015 | Chen | | H04W 56/0045 370/336 |
| 2015/0327198 A1* | 11/2015 | Axmon | | H04W 56/0045 370/336 |
| 2016/0345316 A1* | 11/2016 | Kazmi | | H04W 56/0045 |
| 2017/0111908 A1* | 4/2017 | Xiong | | H04W 48/10 |

\* cited by examiner

TIMING ADVANCE REPORTING FOR LATENCY REDUCTION

CROSS REFERENCES

The present Application for Patent claims priority to U.S. Provisional Patent Application No. 62/421,208 by Hosseini et al., entitled "Timing Advance Reporting For Latency Reduction," filed Nov. 11, 2016, assigned to the assignee hereof.

BACKGROUND

The following relates generally to wireless communication and more specifically to timing advance reporting for latency reduction.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A UE and a base station may communicate based on a timing delay between UL and DL transmissions. For example, an UL grant may be transmitted by a base station that grants the UE access to resources for UL transmission. The UE may then utilize the granted resources for an UL transmission after a time delay. In some cases, the time delay may be predetermined based on a maximum cell size supported by the base station. In other cases, the time delay may be based on a channel configuration or UE capabilities. If, however, the UE is well within the maximum cell size, the time delay may be more than sufficient for timing processing. Further, if the UE does not support or does not wish to communicate according to the capabilities used to determine the time delay, the time spent by the UE waiting for the time delay before transmitting an UL message may be wasted. This may cause inefficiencies through unneeded delay between UL and DL communications between the UE and the base station.

SUMMARY

A user equipment (UE) may transmit an uplink (UL) message to a base station that indicates an UL timing advance associated with the UE. In some cases, the UE may determine whether the UL timing advance is within a range of a timing advance threshold before transmitting the UL message to the base station. Using the UL timing advance, the base station may determine, modify, or adjust the timing configuration used for communicating with the UE. For example, the base station may modify the timing configuration to a shortened timing configuration to reduce the delay between UL and downlink (DL) transmissions. In another case, if the UL timing advance exceeds a threshold, the base station may determine a longer timing configuration for communication delay that increases the time delay between UL and DL communications.

A method of wireless communication is described. The method may include determining an uplink timing advance for a UE based at least in part on a distance between the UE and a base station and transmitting, to the base station, an uplink message that indicates the uplink timing advance.

An apparatus for wireless communication is described. The apparatus may include means for determining an uplink timing advance for a UE based at least in part on a distance between the UE and a base station and means for transmitting, to the base station, an uplink message that indicates the uplink timing advance.

Another apparatus for wireless communication is described. The apparatus may include a processor, memory in electronic communication with the processor, and instructions stored in the memory. The instructions may be operable to cause the processor to determine an uplink timing advance for a UE based at least in part on a distance between the UE and a base station and transmit, to the base station, an uplink message that indicates the uplink timing advance.

A non-transitory computer-readable medium for wireless communication is described. The non-transitory computer-readable medium may include instructions operable to cause a processor to determine an uplink timing advance for a UE based at least in part on a distance between the UE and a base station and transmit, to the base station, an uplink message that indicates the uplink timing advance.

Some examples of the method, apparatus, and non-transitory computer-readable medium described above may further include processes, features, means, or instructions for determining that the uplink timing advance exceeds a threshold, wherein the uplink message may be transmitted based at least in part on the determination that the threshold may be exceeded.

Some examples of the method, apparatus, and non-transitory computer-readable medium described above may further include processes, features, means, or instructions for determining that the uplink timing advance may have a value within a range of a maximum uplink timing advance value, wherein the uplink message may be transmitted based at least in part on the determination that the uplink timing advance may have the value within the range.

In some examples of the method, apparatus, and non-transitory computer-readable medium described above, determining that the uplink timing advance may have a value within the range comprises: identifying one or more intervals that represent an uplink timing advance value relative to the maximum uplink timing advance value, wherein the uplink message indicates at least one of the one or more intervals.

Some examples of the method, apparatus, and non-transitory computer-readable medium described above may further include processes, features, means, or instructions for receiving an indication of the one or more intervals from the base station, wherein the indication may be UE-specific.

In some examples of the method, apparatus, and non-transitory computer-readable medium described above, the one or more intervals may be UE-specific.

In some examples of the method, apparatus, and non-transitory computer-readable medium described above, transmitting the uplink message comprises: periodically transmitting the uplink message.

Some examples of the method, apparatus, and non-transitory computer-readable medium described above may further include processes, features, means, or instructions for receiving, from the base station, an indication of a timing configuration for the UE, the timing configuration based at least in part on the uplink timing advance.

In some examples of the method, apparatus, and non-transitory computer-readable medium described above, the indication of the timing configuration comprises at least one of a transport block size (TB S) limit, a layer constraint, a channel state information (CSI) feedback limit, or a component carrier (CC) limit, or any combination thereof.

In some examples of the method, apparatus, and non-transitory computer-readable medium described above, determining the uplink timing advance comprises: determining a timing advance for each of multiple timing advance groups (TAGs), wherein the uplink message indicates the timing advance for at least one of the multiple TAGs. In some examples of the method, apparatus, and non-transitory computer-readable medium described above, transmitting the uplink message comprises: transmitting multiple uplink messages to the base station, each of the multiple uplink messages indicating the timing advance for at least one of the multiple TAGs.

A method of wireless communication is described. The method may include receiving, from a UE, an uplink message that indicates an uplink timing advance for the UE, wherein the uplink timing advance is based at least in part on a distance between the UE and a base station and determining a timing configuration for the UE based at least in part on the uplink timing advance for the UE.

An apparatus for wireless communication is described. The apparatus may include means for receiving, from a UE, an uplink message that indicates an uplink timing advance for the UE, wherein the uplink timing advance is based at least in part on a distance between the UE and a base station and means for determining a timing configuration for the UE based at least in part on the uplink timing advance for the UE.

Another apparatus for wireless communication is described. The apparatus may include a processor, memory in electronic communication with the processor, and instructions stored in the memory. The instructions may be operable to cause the processor to receive, from a UE, an uplink message that indicates an uplink timing advance for the UE, wherein the uplink timing advance is based at least in part on a distance between the UE and a base station and determine a timing configuration for the UE based at least in part on the uplink timing advance for the UE.

A non-transitory computer-readable medium for wireless communication is described. The non-transitory computer-readable medium may include instructions operable to cause a processor to receive, from a UE, an uplink message that indicates an uplink timing advance for the UE, wherein the uplink timing advance is based at least in part on a distance between the UE and a base station and determine a timing configuration for the UE based at least in part on the uplink timing advance for the UE.

Some examples of the method, apparatus, and non-transitory computer-readable medium described above may further include processes, features, means, or instructions for transmitting an indication of the timing configuration to the UE in response to receiving the uplink message.

In some examples of the method, apparatus, and non-transitory computer-readable medium described above, the uplink message comprises one of a set of uplink messages, wherein each uplink message of the set of uplink messages indicates a timing advance for at least one of multiple TAGs.

In some examples of the method, apparatus, and non-transitory computer-readable medium described above, determining the timing configuration comprises: determining the timing configuration for one or more of the multiple TAGs based at least in part on the indicated timing advance.

Some examples of the method, apparatus, and non-transitory computer-readable medium described above may further include processes, features, means, or instructions for determining that the uplink timing advance exceeds a threshold, wherein the timing configuration may be determined based at least in part on the determination that the uplink timing advance exceeds the threshold.

Some examples of the method, apparatus, and non-transitory computer-readable medium described above may further include processes, features, means, or instructions for determining that the uplink timing advance may have a value within a range of a maximum uplink timing advance value, wherein the timing configuration may be determined based at least in part on the determination that the uplink timing advance may have the value within the range.

In some examples of the method, apparatus, and non-transitory computer-readable medium described above, determining that the uplink timing advance may have a value within the range comprises: identifying one or more intervals that represent an uplink timing advance value relative to the maximum uplink timing advance value, wherein the uplink message indicates at least one of the one or more intervals.

Some examples of the method, apparatus, and non-transitory computer-readable medium described above may further include processes, features, means, or instructions for transmitting an indication of the one or more intervals from the base station, wherein the indication may be UE-specific.

In some examples of the method, apparatus, and non-transitory computer-readable medium described above, the one or more intervals may be UE-specific.

Some examples of the method, apparatus, and non-transitory computer-readable medium described above may further include processes, features, means, or instructions for setting one or more timing advance thresholds for one or more UEs based at least in part on capabilities of the one or more UEs, wherein the timing configuration for the UE may be determined based at least in part on one or more of the timing advance thresholds.

In some examples of the method, apparatus, and non-transitory computer-readable medium described above, determining the timing configuration comprises: setting multiple timing advance thresholds for the UE, wherein intervals between each of the multiple timing advance thresholds correspond to different timing configurations.

Some examples of the method, apparatus, and non-transitory computer-readable medium described above may further include processes, features, means, or instructions for maintaining a timing advance history for the UE based at least in part on the uplink timing advance.

Some examples of the method, apparatus, and non-transitory computer-readable medium described above may further include processes, features, means, or instructions for determining the timing configuration may be based at least in part on the timing advance history.

Some examples of the method, apparatus, and non-transitory computer-readable medium described above may further include processes, features, means, or instructions for determining a timing advance report periodicity for the UE based at least in part on the timing advance history.

Some examples of the method, apparatus, and non-transitory computer-readable medium described above may further include processes, features, means, or instructions for transmitting the timing advance report periodicity to the UE.

Some examples of the method, apparatus, and non-transitory computer-readable medium described above may further include processes, features, means, or instructions for modifying a reporting parameter for the UE based at least in part on the uplink timing advance. Some examples of the method, apparatus, and non-transitory computer-readable medium described above may further include processes, features, means, or instructions for transmitting the modified reporting parameter to the UE.

In some examples of the method, apparatus, and non-transitory computer-readable medium described above, the modified reporting parameter comprises at least one of a TBS limit, a layer constraint, a CSI feedback limit, or a CC limit, or any combination thereof.

DETAILED DESCRIPTION

Figure 1:
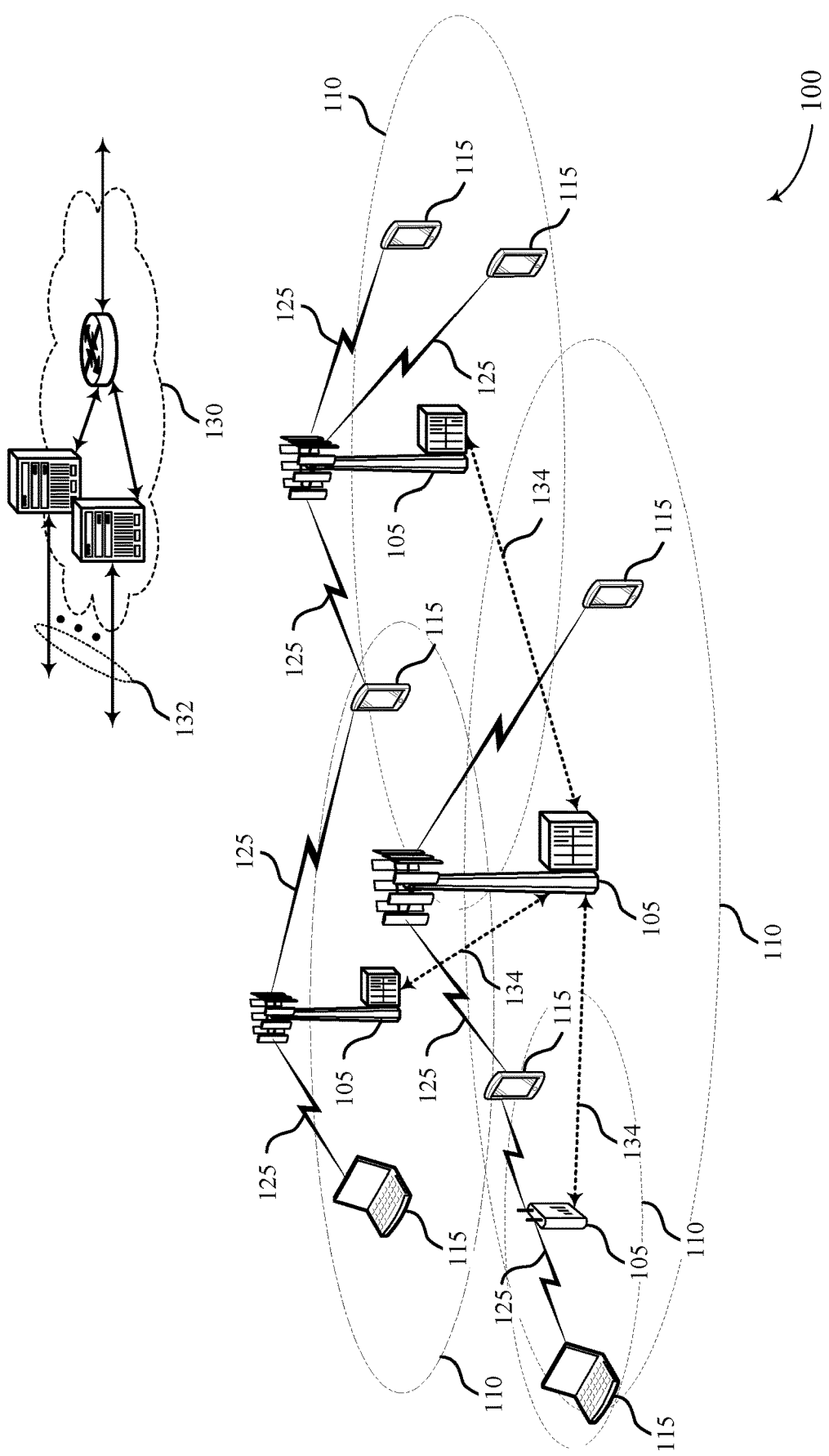
FIG. 1 illustrates an example of a system for wireless communication that supports timing advance reporting for latency reduction in accordance with aspects of the present disclosure.

In a wireless communications system, such as a Long Term Evolution (LTE) or LTE-Advanced (LTE-A) system or a New Radio (NR) system, a user equipment (UE) and a base station may communicate using a timing configuration predetermined based on various network parameters such as cell size, channel configurations, etc. The timing configuration may be tailored according to UE operation, including an actual uplink timing advance employed by the UE. Accordingly, the UE may report a timing advance to facilitate selection of the timing configuration.

The timing configuration may indicate the time delay between uplink (UL) transmissions and downlink (DL) transmissions. For example, a base station may transmit a DL message to a UE over a physical downlink shared channel (PDSCH), which may be received by the UE. To indicate to the base station that the UE has successfully received the DL message, the UE may transmit an acknowledgement (ACK) message (via an UL channel) to the base station. To allow for processing of the DL message transmitted by the base station, the UE may transmit the ACK (or alternatively, if unsuccessfully received, a negative ACK (NACK)) after a time delay. In some cases, however, the time delay used for communication between the UE and base station may exceed the amount of time used by the UE for processing the received DL message. In such instances, the UE may still wait the amount of time indicated by the time delay prior to sending an ACK/NACK. Thus, even if the UE has successfully received the DL message, the UE may waste time waiting to transmit an ACK/NACK based on the timing configuration.

In some cases, the timing configuration may be predetermined based on various communication scenarios (e.g., the supported cell size) or UE capabilities (e.g., whether the UE supports communication via a physical downlink control channel (PDCCH) or an enhanced PDCCH (EPDCCH)). As the UE may not support certain capabilities (e.g., EPDCCH) or as the UE moves within a cell, a shortened timing configuration that indicates a shortened time delay may be used. For example, a UE may determine an uplink timing advance, which may be based on the distance between the UE and the base station. The UE may then transmit an UL message to the base station indicating the UL timing advance. In some cases, the UE may determine whether the UL timing advance crosses or is within a range relative to a timing advance threshold.

The timing advance threshold may be predetermined or dynamically determined (e.g., by a base station). Multiple timing advance thresholds may also be considered. If the UL timing advance determined by the UE exceeds a threshold, the UE may then transmit an UL message indicating the UL timing advance. In some cases, if the UE falls within a range relative to one or more timing advance thresholds, the UE may also transmit an UL message indicating the UL timing advance. Further, if the UL timing advance determined by a UE does not cross a timing advance threshold or is not within a range relative to a timing advance threshold, the UE may choose not to send an UL message.

Once an UL message indicating the UL timing advance is received by the base station, the base station may determine a timing configuration to use for communication with the UE. For example, the base station may determine that the UL timing advance for the UE is below a timing advance threshold and may choose a shortened timing configuration for communication with the UE. The shortened timing configuration may indicate a shorter time delay between UL and DL transmissions. In some examples, the base station may determine that a longer timing configuration may be more appropriate for communicating with the UE and may therefore select, modify, or otherwise determine a timing configuration with a longer time delay between UL and DL transmission. Thus, according to the present disclosure, a UE and a base station may communicate using a timing configuration that may vary between short time delays and longer time delays depending on the situation.

Aspects of the disclosure introduce above are described below in the context of a wireless communications system. Examples of a timing configuration and a process flow that support timing advance reporting in accordance with aspects of the present disclosure are also described. Aspects of the disclosure are further illustrated by and described with reference to apparatus diagrams, system diagrams, and flowcharts that relate to timing advance reporting for latency reduction.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-A network or a NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions). Base stations 105 may communicate with UEs 115 according to a timing configuration that is determined according to a UL timing advance of the UEs 115.

The UEs 115 may be dispersed throughout the wireless communications system 100, and each UE 115 may be stationary or mobile. A UE 115 may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. The UEs 115 may determine an uplink timing advance based on a distance from a base station 105, for example. A UE 115 may report its uplink timing advance to a base station 105, which may be used to determine a timing configuration for communication with the UE 115.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. The UEs 115 may, in some cases, report a timing advance (e.g., a sidelink timing advance) to one another.

Some UEs 115, such as MTC or Iota devices, may be low cost or low complexity devices, and may provide for automated communication between machines (i.e., Machine-to-Machine (M2M) communication). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. The capabilities or limitations of such UEs 115 may be a factor or may impact a timing configuration.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, wireless communications system 100 may support millimeter wave (mmW) communications between UEs 115 and base stations 105. Devices operating in mmW or EHF bands may have multiple antennas to allow beamforming.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR, which may be supported by wireless communications system 100, may be expressed in multiples of a basic time unit (which may be a sampling period of Ts=1/30, 720,000 seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs for carrier aggregation. Carrier aggregation may be used with both frequency division duplex (FDD) and time division duplex (TDD) component carriers. Multiple base stations 105 or cells may communicate with a UE 115 in a dual connectivity configuration in which CCs are aggregated an the base stations 105 have a poor or non-ideal backhaul connection. In such cases, the cells associated with different base stations 105 may be in different timing adjustment groups (TAGs). A UE 115 may be physically located closer or near to certain base stations 105 of a dual connectivity (DC) configuration, so different uplink timing adjustment, and thus different timing configurations, may be applied for cells of different TAGs.

In some cases, wireless communications system 100 may utilize enhanced component carriers (eCCs). An eCC may be characterized by one or more features including wider bandwidth, shorter symbol duration, shorter TTIs (e.g., shortened TTIs (sTTIs) or micro TTIs (uTTIs)), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). This may include the 5 GHz Industrial, Scientific, and Medical (ISM) band. An eCC characterized by wide bandwidth may include one or more segments that may be utilized by UEs 115 that are not capable of monitoring the whole bandwidth or prefer to use a limited bandwidth (e.g., to conserve power). TTIs of shorter duration may be employed to facilitate shorter timing configurations.

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds (μs)). In some examples, a UE 115 may use a short TTI to shorten processing times, which may enable the UE 115 to transmit UL messages in response DL control information with reduced delay.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include DL transmissions, UL transmissions, or both. Duplexing in unlicensed spectrum may be based on FDD, TDD or a combination of both.

Wireless systems that support low latency operations, such as wireless communications system 100, may utilize timing configurations and TTI configurations to reduce a delay between UL and DL transmission. Thus, a UE 115 and a base station 105 may communicate using a timing configuration which may reduce a delay between UL and DL transmissions, which may involve shortened processing times for the UE 115 for reducing delay between UL and DL transmissions.

Figure 2:
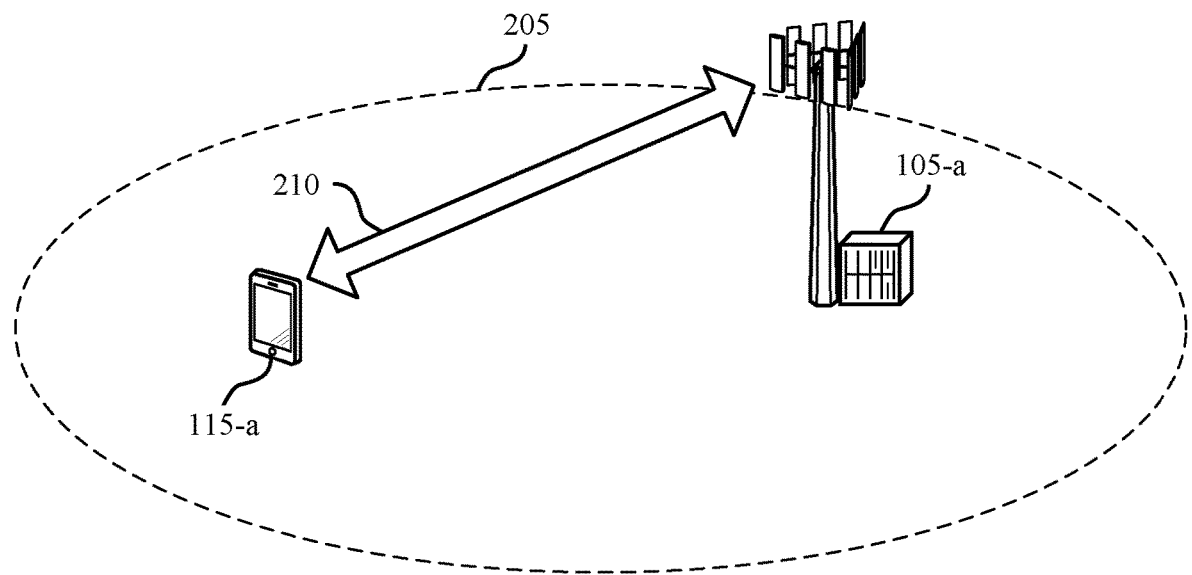
FIG. 2 illustrates an example of a wireless communications system that supports timing advance reporting for latency reduction in accordance with aspects of the present disclosure.

FIG. 2 illustrates an example of a wireless communications system 200 for timing advance reporting for latency reduction. Wireless communications system 200 may include a base station 105-a and a UE 115-a, which may be examples of the corresponding devices described with reference to FIG. 1. Base station 105-a and UE 115-a may communicate over communication link 210. Wireless communication system 200 may employ UL timing advance (TA) reporting from UE 115-a to base station 105-a to determine or configure a timing configuration with a reduced latency.

In some systems, timing between a DL transmission (e.g., an UL grant from base station 105-a) and a corresponding UL message (e.g., transmitted by UE 115-a over a PUSCH) may be set to a certain value, which may not be dynamically configured. As one example, the timing may be set at n+4, indicating that a transmission responsive to signaling received in TTI n may occur four (4) TTIs later. In some cases, this timing may be determined in relation to a worst-case scenario that accounts for a maximum TA (TAmax) that may be used for UE 115-a, which may be set to any time value between 1 µs and 1000 µs. In one example, TAmax may be set to a time value of 667 µs which may not account for the TA actually determined by UE 115-a.

The timing may also be depend whether EPDCCH scheduling is allowed. As EPDCCH may be multiplexed according to an FDM scheme throughout a duration of a TTI, EPDCCH-based scheduling may cause UE 115-a to decode an entire DL TTI before switching to UL operation. This may affect the timing at which the wireless communication system 200 anticipates UE 115-a being capable of UL operation and therefore may also affect the timing configuration employed by UE 115-a and base station 105-b.

According to some aspects, timing between UL and DL TTIs may be reduced by reducing TAmax, restricting scheduling to PDCCH-based scheduling, or by determining an actual TA used by UE 115-a, or a combination thereof. As one example, reducing TAmax and allowing only PDCCH based scheduling may allow for a shortened processing timing of n+3. In some cases TAmax may be reduced by setting TAmax to a first time value for a first given cell radius, setting TAmax to a second time value for a second given cell radius, etc. For example, TAmax may be reduced to a time value from 333 µs down to 67 µs for a cell radius of 10 km or TAmax may be set to 333 µs for a cell radius of 50 km, etc.

Reducing TAmax or employing an intermediate TA threshold, may allow base station 105-a to schedule UE 115-a according to various timing configurations (e.g., n+5, n+4, n+3, n+2). As one example, base station 105-a may schedule UE 115-a based on a determination whether the UL TA of UE 115-a crosses a TAmax threshold. For instance, base station 105-a may be configured to treat TAmax as a threshold that determines whether base station 105-a schedules UE 115-a according to a legacy processing timing (e.g., n+4) or a shortened processing timing (e.g., n+3). In one example, base station 105-a may schedule UE 115-a with the shortened processing timing when the TA of UE 115-a is smaller than TAmax. Further, base station 105-a may schedule UE 115-a with the legacy processing timing when the TA of UE 115-a is greater than TAmax.

In some cases, base station 105-a may schedule the legacy and shortened processing timings according to CC groups under CA/CA/DC operation. For example, base station 105-a may schedule the legacy processing timings to a first CC group and schedule the shortened processing timings to a second CC group based on TA values for the respective CC groups.

In some examples, base station 105-a may receive the TA information from UE 115-a before determining the timing configuration to be used for UE 115-a. Base station 105-a may determine which processing timing to apply based on the TA information received from UE 115-a. Typically, except during the initial access process (e.g., Physical Random Access Channel (PRACH)), base station 105-a may not know the TA experienced by UE 115-a and thus may be unable to accurately determine the TA to use for selecting a timing configuration. This may be due to UE 115-a being allowed to autonomously adjust its UL transmission timing to track changes in received DL timing based on DL transmissions. In some cases, although the UL link may be clear, the DL link may be either blocked or experience a large delay spread. In such a scenario, the TA computed by base station 105-a based on UL transmissions may be inaccurate. Accordingly, in order to enable processing timing modification based on the TA value, UE 115-a may feedback its TA value to base station 105-a.

In some cases, such as in the case of CA/DC operation, the TA for different Timing Advance Groups (TAGs) may be reported to base station 105-a. For example, one or more UEs 115 in a first TAG may report the group TA for the first TAG to base station 105-a, one or more UEs 115 in a second TAG may report the group TA for the second TAG to base station 105-a, etc. In some instances, UE 115-a may be part of a first TAG and a second TAG and may transmit a TA for each of the first TAG and the second TAG in an uplink message to base station 105-a. Additionally or alternatively, UE 115-a may piggyback reporting for a second TAG when reporting a TA for a first TAG.

In some examples, base station 105-a may apply the legacy or the shortened processing timing without knowing the actual TA value of UE 115-a. For instance, base station 105-a may receive information from UE 115-a indicating that the UE TA value has crossed or is within a range relative to a TA threshold. In such cases, UE 115-a may transmit this indication in an uplink message, but may not include an actual TA value. Thus, base station 105-a may determine whether to apply the legacy or the shortened processing timing based on a determination of whether the TA seen at UE 115-a is above the threshold or not and/or a determination of how close or far the TA value is to the threshold or how much TA headroom there is between the TA and TAmax. Consequently, base station 105-a may not determine the timing configuration based on the actual TA value of UE 115-a.

In some cases, base station 105-a may configure two or more timing thresholds. For example, base station 105-a may configure a TAmax1 as a first threshold and a TAmax2 as a second threshold, where TAmax1 is a time value different than TAmax2. Base station 105-a may then determine the timing configuration with respect to the first and second thresholds.

According to some aspects, a timing threshold may be configured based on EPDCCH based scheduling being supported and the capabilities of UE 115-a. In some cases, different UEs 115 may have different margins for operating under the shortened processing timings and/or different margins for operating under the legacy processing timings. Thus, multiple UEs 115 may be configured with different timing configurations. Further, a value of a timing threshold may be configured based on the configuration or capabilities of one or more UEs 115. For example, a first timing value may be configured based on a configuration of a first UE 115 and a second timing threshold may be configured based on a configuration of a second UE 115.

In some examples, base station 105-a may consider a TA to be in a shortened processing region when the TA is below the timing threshold TAmax and consider a TA to be in a legacy processing region when the TA is above the timing threshold TAmax. In one example, UE 115-a may send a TA report to base station 105-a whenever the TA value of UE 115-a falls within one of the shortened processing region and the legacy processing regions, as will be discussed below. Further, in some examples, the shortened processing region and the legacy processing regions may be split into multiple intervals, and UE 115-a may send a TA report to base station 105-a whenever the TA value of UE 115-a crosses into one of the intervals of one of the regions.

In some examples, both the shortened processing region and the legacy processing region may include no feedback intervals. In one example, the shortened processing region may start at TA=0 and end at TAmax, and the legacy processing region may start at TAmax and end at TA=667 μs. In some examples, the no feedback interval of the shortened processing region may start at TA=0 and end at the first interval of the shortened processing region, followed by one or more intervals of the shortened processing region up to TAmax. In some examples, the no feedback interval of the legacy processing region may start after one or more intervals of the legacy processing region and end at TA=667 In some cases, UE 115-a may send a TA report to base station 105-a whenever the TA value of UE 115-a is in the shortened processing region, but not in the no feedback interval of the shortened processing region. Likewise, UE 115-a may send a TA report to base station 105-a whenever the TA value of UE 115-a is in the legacy processing region, but not in the no feedback interval of the legacy processing region.

Figure 3:
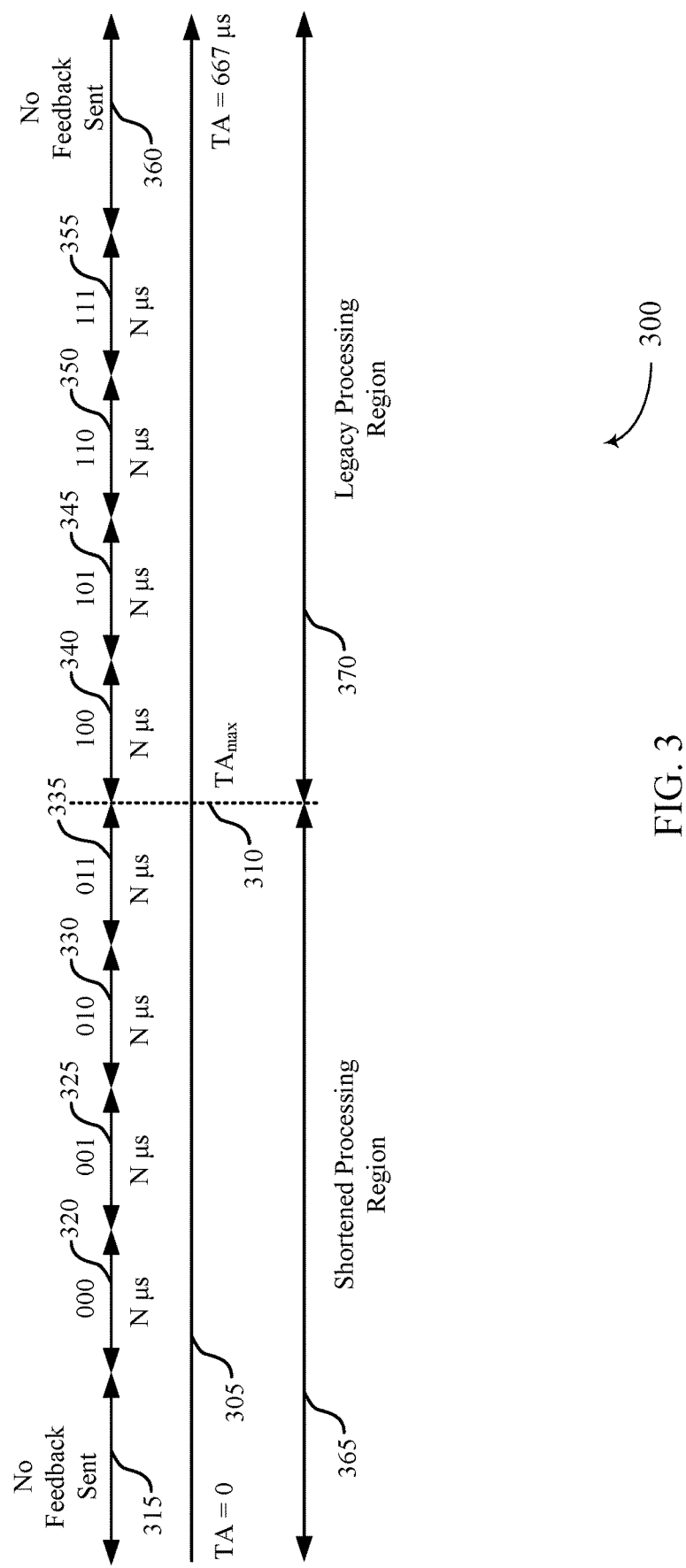
FIG. 3 illustrates an example of a timing configuration that supports timing advance reporting for latency reduction in accordance with aspects of the present disclosure.

FIG. 3 illustrates an example of a TA timeline 300 for timing advance reporting for latency reduction. TA timeline 300 may include timeline 305. As illustrated, timeline 305 may extend from TA=0 to TA=667 In some examples, timeline 305 may extend to more or less than 667 μs. In some examples, TA timeline 300 structure may include timing threshold 310. In some cases, timing threshold 310 may be set by a base station 105. In some cases, timing threshold 310 may be set to a maximum TA (TAmax). As one example, TAmax may be set to 333 μs.

In one example, timeline 305 may be divided into two or more regions. As illustrated, timeline 305 may be divided into a shortened processing region 365 and a legacy processing region 370. In some cases, the regions 365 and 370 may be separated by timing threshold 310.

In some examples, shortened processing and legacy processing regions 365 and 370, respectively, may each be divided into two or more intervals. In one example, shortened processing region 365 may be divided into the same number of intervals as legacy processing region 370. Alternatively, each region may be divided into a different number of intervals, where shortened processing region 365 includes more or less intervals than in legacy processing region 370. As illustrated, shortened processing region 365 may include at least one interval. In some cases, shortened processing region 365 may include two or more intervals. As illustrated, shortened processing region 365 may include a first interval 320, a second interval 325, a third interval 330, and a fourth interval 335.

As shown, legacy processing region 370 may include at least one interval. In some cases, legacy processing region 370 may include two or more intervals. As illustrated, legacy processing region 370 may include a fifth interval 340, a sixth interval 345, a seventh interval 350, and an eighth interval 355. As shown, intervals 320-335 and/or intervals 340-355 may span a certain time period of N μs. As one example, intervals 320-335 and/or 340-355 may span an interval anywhere from 1 μs to 100 μs. In one example, each interval may span the same time period. Alternatively, at least one interval may span a time period different than the time period of one or more other intervals. For example, first interval 320 may span 5 μs, second interval 325 may span 10 μs, and so forth. In some examples, the time span of intervals adjacent to a timing threshold may be less than the time span of intervals not adjacent to the timing threshold. For example, fourth interval 335 and fifth interval 340 (i.e., adjacent to timing threshold 310) may be configured to have a time span of 5 μs, while third interval 330 and sixth interval 345 (i.e., not adjacent to timing threshold 310) may be configured to have a time span of 10 μs.

As shown, shortened processing and legacy processing regions 365 and 370, respectively, may include a total of 8 intervals. Thus, in some cases 3 bits may be used to map the TA of a UE 115 to one of the 8 intervals. As illustrated, first interval 320 of shortened processing region 365 may be assigned a bit value of 000, second interval 325 of shortened processing region 365 may be assigned a bit value of 001, and so forth, up to eighth interval 355 of legacy processing region 370 being assigned a bit value of 111. In some cases, mapping the TA of the UE 115 to an interval may indicate the distance of the TA to the timing threshold TAmax. For example, when the TA of the UE 115 is in first interval 320, the UE 115 may send the bits 000 to a base station 105 to indicate the TA of the UE 115 is in first interval 320, which indicates to the base station 105 that the TA of the UE 115 has a distance (e.g., a time offset) of 30-40 μs from the TAmax timing threshold 310.

In some examples, shortened processing region 365 and/or legacy processing region 370, respectively, may include a no feedback zone. For example, shortened processing region 365 may include a no feedback zone 315. In some examples, no feedback zone 315 of shortened processing region 365 may start at TA=0 and end at first interval 320. Additionally, or alternatively, legacy processing region 370 may include a no feedback zone 360. In some examples, no feedback zone 360 of legacy processing region 370 may start at fourth interval 355 and end at TA=667 μs.

In one example, a UE 115 may send a TA report to a base station 105 whenever the TA value of the UE 115 lies within one of shortened processing region 365 and legacy processing region 370. In one example, the UE 115 may send a TA report to the base station 105 whenever the TA value of the UE 115 crosses into one of the intervals of one of the regions 365 or 370. In one example, the base station 105 may consider a TA of the UE 115 to be in shortened processing region 365 when the TA is below timing threshold 310 and consider the TA to be in legacy processing region 370 when the TA is above timing threshold 310.

In some examples, no feedback zone 360 of legacy processing region 370 may start after one or more intervals of legacy processing region 370 and end at TA=667 µs. In some cases, the UE 115 may send a TA report to the base station 105 whenever the TA value of the UE 115 is in shortened processing region 365, but not in no feedback zone 315 of shortened processing region 365. Likewise, the UE 115 may send a TA report to the base station 105 whenever the TA value of the UE 115 is in legacy processing region 370, but not in no feedback zone 360 of legacy processing region 370.

In some cases, a non-uniform quantization of shortened processing region 365 and legacy processing region 370 may be implemented. For example, the time periods of the intervals may be reduced the closer the intervals get to TAmax to improve the accuracy of TAs the nearer the TAs are to TAmax.

In some examples, a base station 105 may change the processing timing when the TA feedback indicates that a threshold value is crossed. In some cases, defining multiple intervals may enable the base station 105 to track the changes in the TA over time. In some cases, the base station 105 may impose certain restrictions in order to ease the processing at a UE 115 based on how close the TA is to the TAmax timing threshold. For example, when the TA is relatively close to the timing threshold and the processing is based on the shortened processing timing, the base station 105 may choose to limit the Transport Block Size (TBS), to constrain the number of layers, to limit the CSI feedback requirement, and so forth. In some cases, the base station 105 limiting the TBS may enable the base station 105 to be flexible in terms of processing timing modifications.

In some examples, a base station 105 may receive TA headroom reporting from one or more CC groups. In some cases, different CC groups may be configured with different processing timing. As a result, the TA headroom may be reported for each CC group. When a UE 115 is configured with two or more TAGs, the TA headroom reporting may be performed separately for each group and/or jointly, at least within some groups. For example, the UE 115 may piggyback reporting for additional TAGs when reporting TA headroom for a first TAG (e.g., TAG1).

In addition to or as an alternative to sending the TA headroom or the distance between the TA and TAmax, a UE 115 may be configured to report its TA based on a predetermined time period whenever the TA is within one of a defined set of intervals. In some cases, an entire range of TA values may be quantized to reduce the overhead in the case of periodic TA reporting. In some examples, a uniform or non-uniform quantization may be implemented. In some cases, a report periodicity may be configured by a base station 105. In some examples, a period of headroom reporting may be tuned based on a TA reporting history. The TA reporting history may include data indicating whether the TA of the UE 115 or TAG is decreasing or increasing in a consistent manner, how close or how far the TA value is to the one or more timing thresholds, and so forth.

Figure 4:
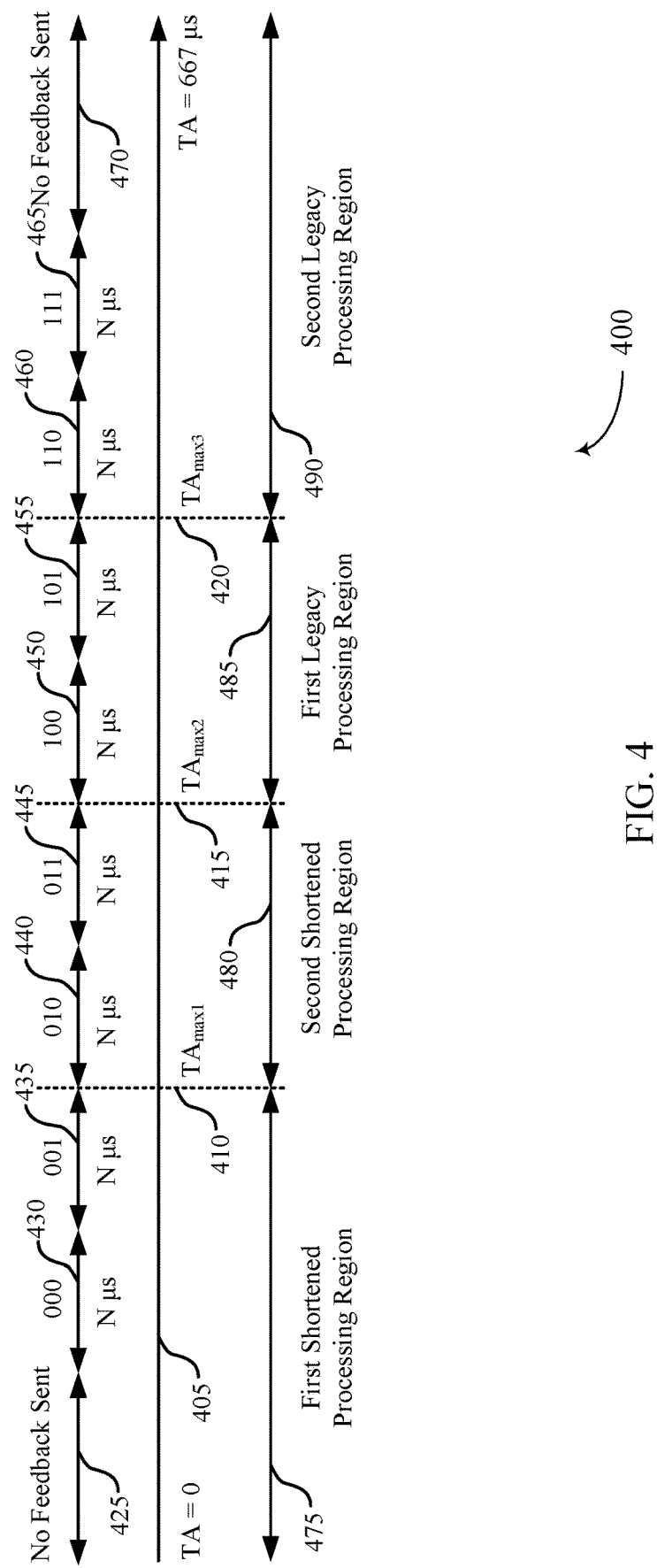
FIG. 4 illustrates an example of a timing configuration that supports timing advance reporting for latency reduction in accordance with aspects of the present disclosure.

FIG. 4 illustrates an example of a TA timeline 400 for timing advance reporting for latency reduction. TA timeline 400 may be one example of TA timeline 300. TA timeline 400 may include timeline 405. As illustrated, timeline 405 may extend from TA=0 to TA=667 µs. Alternatively, timeline 405 may extend to more or less than 667 µs. In some examples, TA timeline 400 structure may include a first timing threshold 410, a second timing threshold 415, and a third timing threshold 420. In some cases, at least one of first timing threshold 410, second timing threshold 415, and third timing threshold 420 may be configured by a base station 105. In some cases, first timing threshold 410 may be set to a first maximum TA (TAmax1), second timing threshold 415 may be set to a second maximum TA (TAmax2), and/or third timing threshold 420 may be set to a third maximum TA (TAmax3). As one example, TAmax1 may be set to 233 µs, TAmax2 may be set to 333 µs, and TAmax3 may be set to 433 µs.

In one example, timeline 405 may be divided into two or more regions. As illustrated, timeline 405 may be divided into a first shortened processing region 475, a second shortened processing region 480, a first legacy processing region 485, and a second legacy processing region 490. As shown, regions 475, 480, 485, and 490 may be separated by timing thresholds 410, 415, and 420.

In some examples, regions 475, 480, 485, and 490 may each be divided into two or more intervals. In one example, each region may be divided into the same number of intervals as the other regions. Alternatively, at least one region may be divided into a different number of intervals than another region. As illustrated, first shortened processing region 475 may include a first interval 430 and a second interval 435, second shortened processing region 480 may include a third interval 440 and a fourth interval 445, first legacy processing region 485 may include a fifth interval 450 and a sixth interval 455, and second legacy processing region 490 may include a seventh interval 460 and an eighth interval 465.

Figure 5:
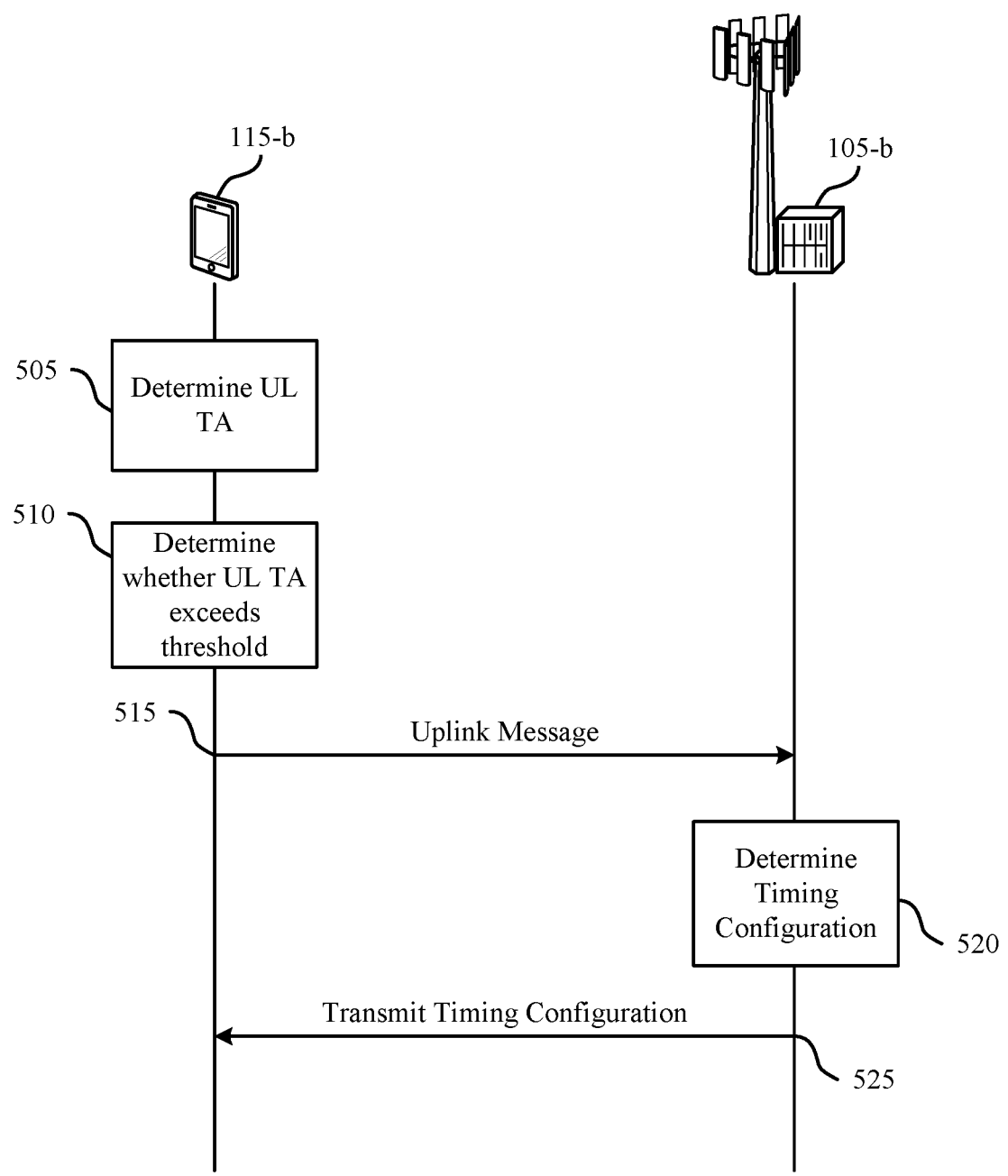
FIG. 5 illustrates an example of a process flow that supports timing advance reporting for latency reduction in accordance with aspects of the present disclosure.

FIG. 5 illustrates an example of a process flow 500 for timing advance reporting for latency reduction. Process flow 500 may be implemented by a UE 115-*b* and a base station 105-*b*, as shown. UE 115-*b* and base station 105-*b* may be examples of aspects of a UE 115 and base station 105 as described with reference to FIGS. 1 and 2.

At 505, UE 115-*b* may determine an UL TA associated with UE 115-*b*. In some cases, the UL TA may be determined based on a distance between base station 105-*b* and UE 115-*b*.

At 510, UE 115-*b* may determine whether the UL TA determined in 505 exceeds a threshold. In some cases, UE 115-*b* may determine that the UL TA crosses a threshold or is within a range relative to a threshold. The threshold may be a TAmax threshold as described above with reference to FIGS. 2-4. In some instances, multiple thresholds may be used in determining whether the UL TA exceeds, crosses, or falls within a range relative to one of the multiple thresholds.

At 515, based on the determination in 510, UE 115-*b* may transmit an UL message to base station 105-*b*. The UL message may include an indication of the UL TA value determined in 505. In some instances, the UL message may include the UL TA value determined in 505. In other instances, the UL message may indicate that the UL TA value crosses or is in a range relative to one or more thresholds.

At 520, using information from or indicated by the UL message transmitted in 515, base station 105-*b* may determine a timing configuration to use for communication with UE 115-*b*. The timing configuration may indicate a shorter or longer time delay between UL and DL transmission. The timing configuration may be selected from multiple timing configurations and may be based on the relative proximity of the UL TA value with respect to one or more thresholds. The timing configuration may be modified from a legacy timing configuration to a shortened timing configuration. In some examples, the timing configuration may indicate a longer time delay between UL and DL transmission.

At 525, base station 105-*b* may transmit according to the timing configuration determined in 520 to UE 115-*b*. In some cases, the transmission may indicate the timing configuration or a change in timing configuration or may indicate the time delay to use for processing, which may then be used by UE 115-*b* for communication with base station 105-*b*.

Figure 6:
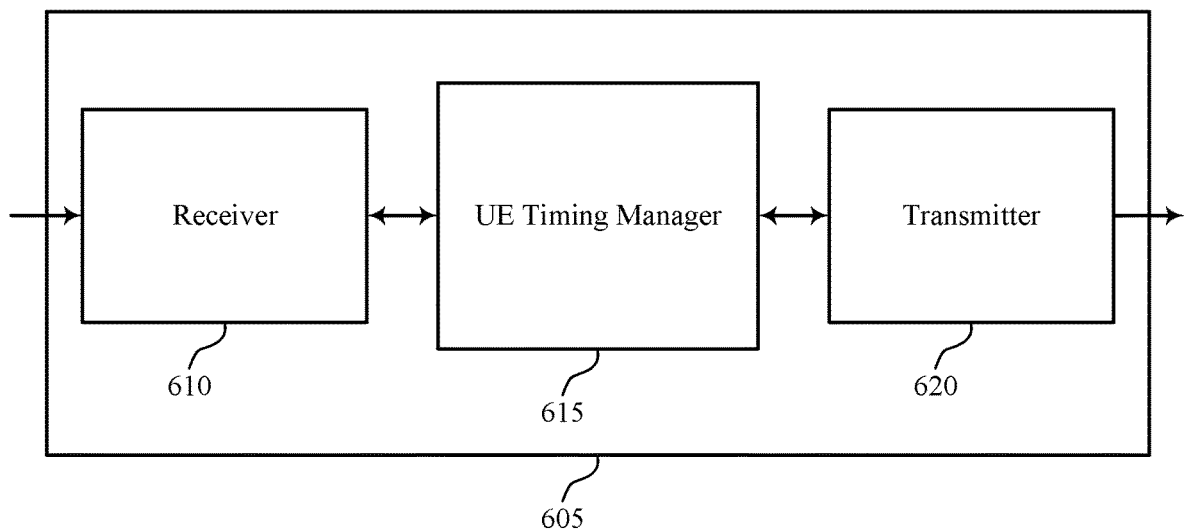
FIGS. 6 through 8 show block diagrams of a device or devices that support timing advance reporting for latency reduction in accordance with aspects of the present disclosure.

FIG. 6 shows a block diagram 600 of a wireless device 605 that supports timing advance reporting for latency reduction in accordance with various aspects of the present disclosure. Wireless device 605 may be an example of aspects of a UE 115 as described with reference to FIG. 1. Wireless device 605 may include receiver 610, UE timing manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to timing advance reporting for latency reduction, etc.). Information may be passed on to other components of the device. The receiver 610 may be an example of aspects of the transceiver 935 described with reference to FIG. 9.

UE timing manager 615 may be an example of aspects of the UE timing manager 915 described with reference to FIG. 9.

UE timing manager 615 and/or at least some of its various sub-components may be implemented in hardware, software executed by a processor, firmware, or any combination thereof. If implemented in software executed by a processor, the functions of the UE timing manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE timing manager 615 and/or at least some of its various sub-components may be physically located at various positions, including being distributed such that portions of functions are implemented at different physical locations by one or more physical devices. In some examples, UE timing manager 615 and/or at least some of its various sub-components may be a separate and distinct component in accordance with various aspects of the present disclosure. In other examples, UE timing manager 615 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

UE timing manager 615 may determine an uplink timing advance for a UE based on a distance between the UE and a base station and transmit, to the base station, an uplink message that indicates the uplink timing advance.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
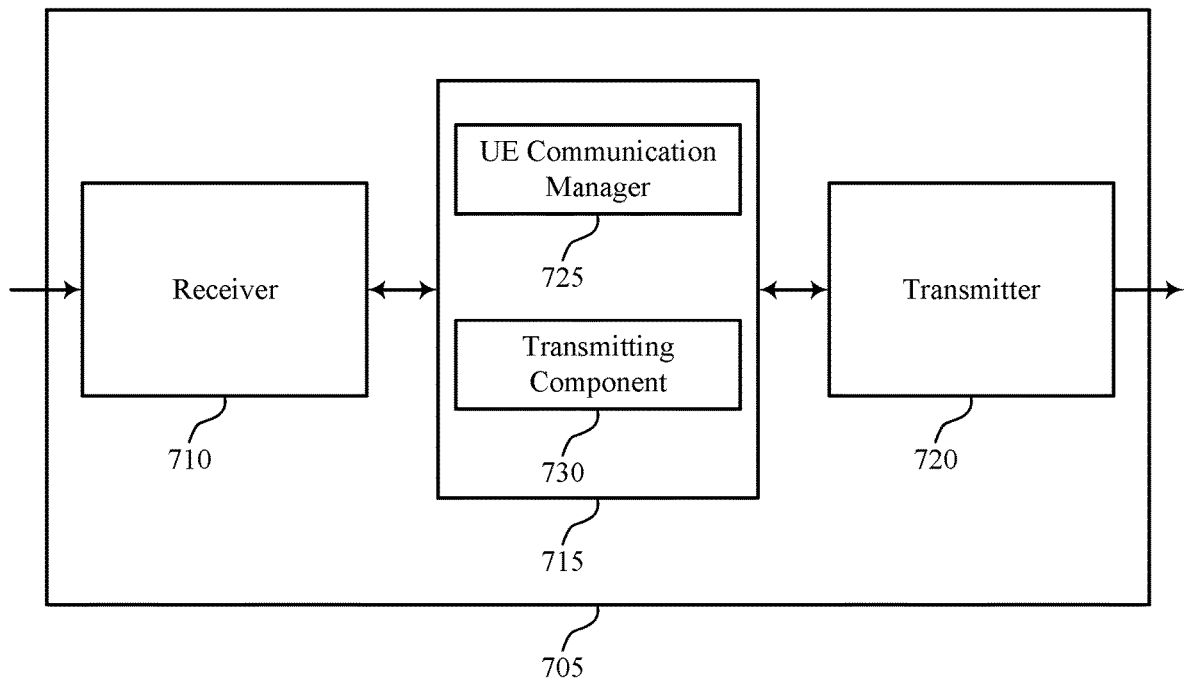

FIG. 7 shows a block diagram 700 of a wireless device 705 that supports timing advance reporting for latency reduction in accordance with various aspects of the present disclosure. Wireless device 705 may be an example of aspects of a wireless device 605 or a UE 115 as described with reference to FIGS. 1 and 6. Wireless device 705 may include receiver 710, UE timing manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to timing advance reporting for latency reduction, etc.). Information may be passed on to other components of the device. The receiver 710 may be an example of aspects of the transceiver 935 described with reference to FIG. 9.

UE timing manager 715 may be an example of aspects of the UE timing manager 915 described with reference to FIG. 9. UE timing manager 715 may also include UE communication manager 725 and transmitting component 730.

UE communication manager 725 may determine an uplink timing advance for a UE based on a distance between the UE and a base station. In some cases, the UE is capable of supporting communication via at least one of a PDCCH or an EPDCCH, or both.

Transmitting component 730 may transmit, to the base station, an uplink message that indicates the uplink timing advance and transmit multiple uplink messages to the base station, each of the multiple uplink messages indicating the timing advance for at least one of the multiple TAGs. In some cases, transmitting the uplink message includes periodically transmitting the uplink message. In some cases, the uplink message is transmitted based on the UE capability.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
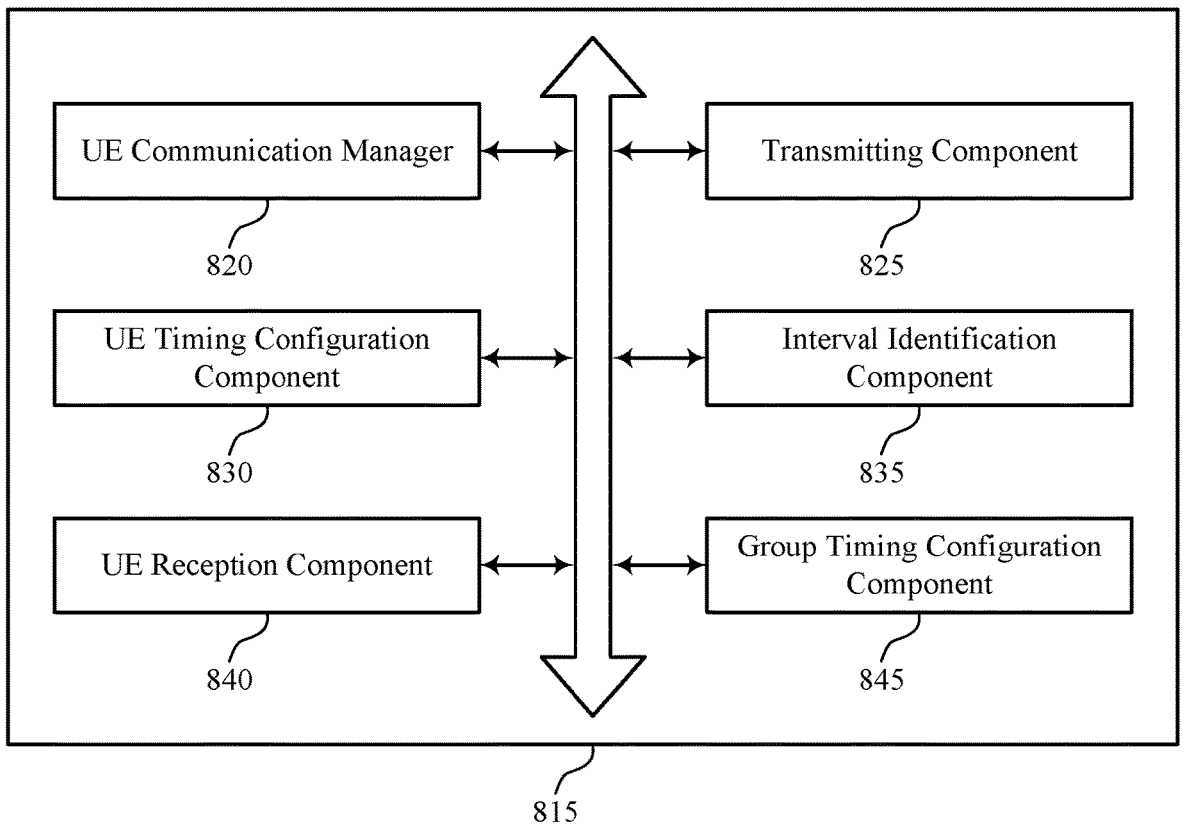

FIG. 8 shows a block diagram 800 of a UE timing manager 815 that supports timing advance reporting for latency reduction in accordance with various aspects of the present disclosure. The UE timing manager 815 may be an example of aspects of a UE timing manager 615, a UE timing manager 715, or a UE timing manager 915 described with reference to FIGS. 6, 7, and 9. The UE timing manager 815 may include UE communication manager 820, transmitting component 825, UE timing configuration component 830, interval identification component 835, UE reception component 840, and group timing configuration component 845. Each of these modules may communicate, directly or indirectly, with one another (e.g., via one or more buses).

UE communication manager 820 may determine an uplink timing advance for a UE based on a distance between the UE and a base station. In some cases, the UE is capable of supporting communication via at least one of a PDCCH or an EPDCCH, or both.

Transmitting component 825 may transmit, to the base station, an uplink message that indicates the uplink timing advance and transmit multiple uplink messages to the base station, each of the multiple uplink messages indicating the timing advance for at least one of the multiple TAGs. In some cases, transmitting the uplink message includes periodically transmitting the uplink message. In some cases, the uplink message is transmitted based on the UE capability.

UE timing configuration component 830 may determine that the uplink timing advance exceeds a threshold, where the uplink message is transmitted based on the determination that the threshold is exceeded and determine that the uplink timing advance has a value within a range of a maximum uplink timing advance value, where the uplink message is transmitted based on the determination that the uplink timing advance has the value within the range. In some cases, the indication of the timing configuration includes at least one of a TBS limit, a layer constraint, a CSI feedback limit, or a CCs limit, or any combination thereof. In some cases, the uplink timing advance is determined based on channel characteristic.

Interval identification component 835 may identify one or more intervals. In some cases, determining that the uplink timing advance has a value within the range includes identifying one or more intervals that represent an uplink timing advance value relative to the maximum uplink timing advance value, where the uplink message indicates at least one of the one or more intervals. In some cases, each of the one or more intervals has a same duration. In some cases, the one or more intervals have different durations. In some cases, the one or more intervals are UE-specific (e.g., based on a characteristic or capability of the particular UE).

UE reception component 840 may receive an indication of the one or more intervals from the base station, where the indication is UE-specific, and receive, from the base station, an indication of a timing configuration for the UE, the timing configuration based on the uplink timing advance.

Group timing configuration component 845 may determine timing for one or more TAGs. In some cases, determining the uplink timing advance includes determining a timing advance for each of multiple TAGs. In some cases, the uplink message indicates the timing advance for at least one of the multiple TAGs.

Figure 9:
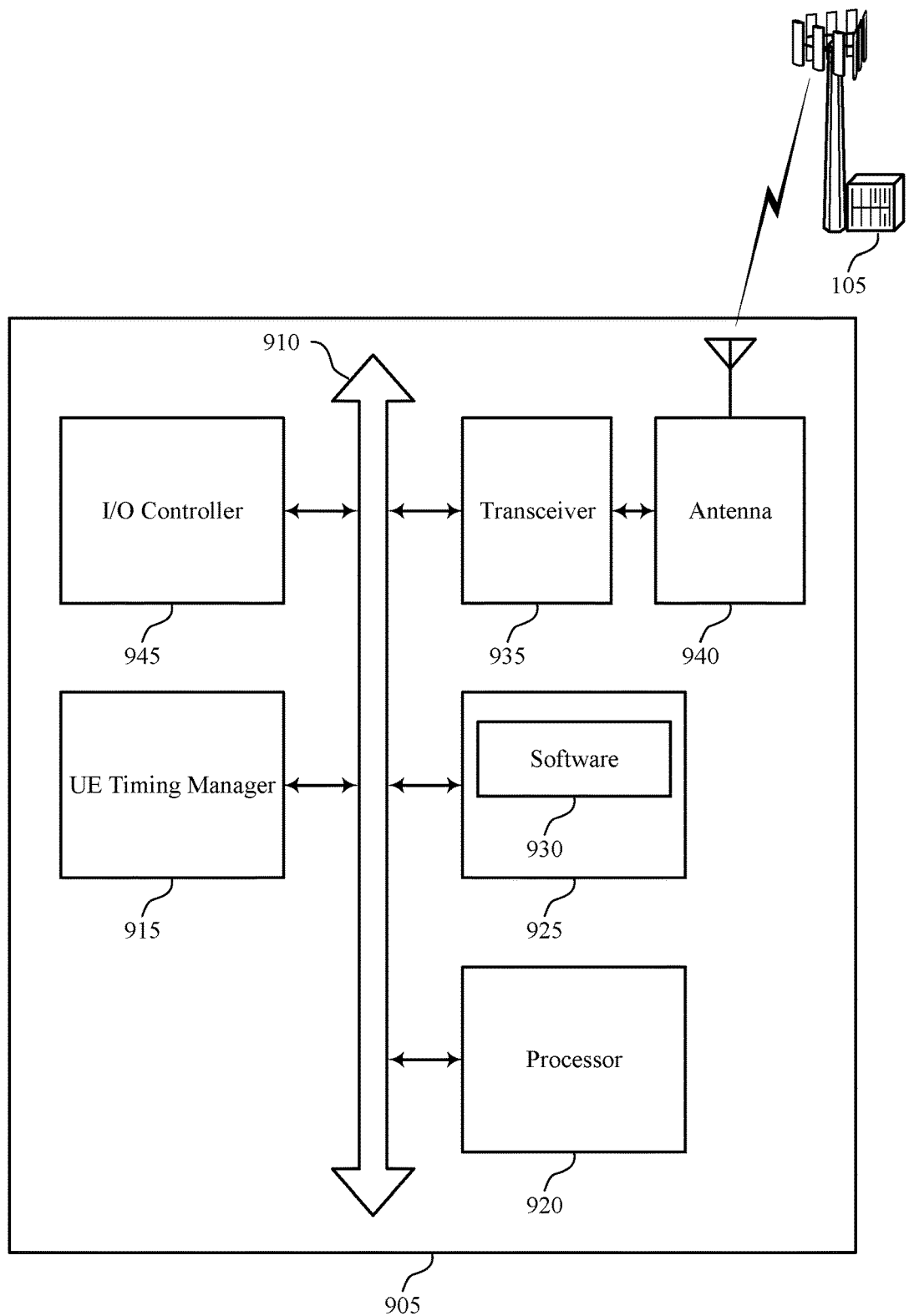
FIG. 9 illustrates a block diagram of a system including a UE that supports timing advance reporting for latency reduction in accordance with aspects of the present disclosure.

FIG. 9 shows a diagram of a system 900 including a device 905 that supports timing advance reporting for latency reduction in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE timing manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting timing advance reporting for latency reduction).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support timing advance reporting for latency reduction. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
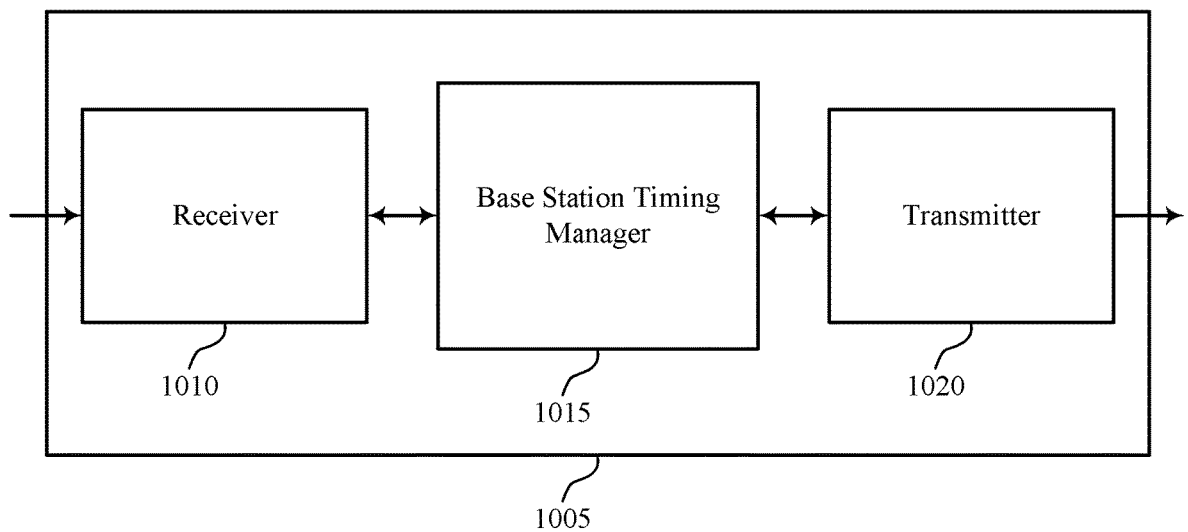
FIGS. 10 through 12 show block diagrams of a device or devices that support timing advance reporting for latency reduction in accordance with aspects of the present disclosure.

FIG. 10 shows a block diagram 1000 of a wireless device 1005 that supports timing advance reporting for latency reduction in accordance with various aspects of the present disclosure. Wireless device 1005 may be an example of aspects of a base station 105 as described with reference to FIG. 1. Wireless device 1005 may include receiver 1010, base station timing manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to timing advance reporting for latency reduction, etc.). Information may be passed on to other components of the device. The receiver 1010 may be an example of aspects of the transceiver 1335 described with reference to FIG. 13.

Base station timing manager 1015 may be an example of aspects of the base station timing manager 1315 described with reference to FIG. 13.

Base station timing manager 1015 and/or at least some of its various sub-components may be implemented in hardware, software executed by a processor, firmware, or any combination thereof. If implemented in software executed by a processor, the functions of the base station timing manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station timing manager 1015 and/or at least some of its various sub-components may be physically located at various positions, including being distributed such that portions of functions are implemented at different physical locations by one or more physical devices. In some examples, base station timing manager 1015 and/or at least some of its various sub-components may be a separate and distinct component in accordance with various aspects of the present disclosure. In other examples, base station timing manager 1015 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Base station timing manager 1015 may receive, from a UE, an uplink message that indicates an uplink timing advance for the UE, where the uplink timing advance is based on a distance between the UE and a base station and determine a timing configuration for the UE based on the uplink timing advance for the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
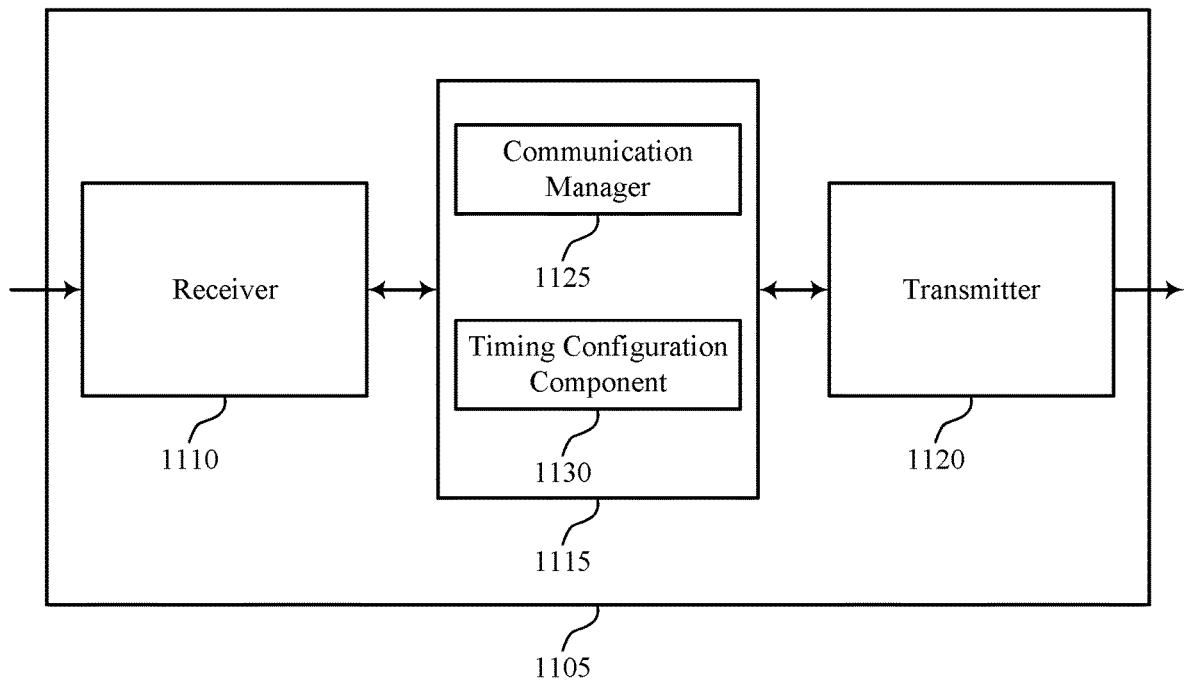

FIG. 11 shows a block diagram 1100 of a wireless device 1105 that supports timing advance reporting for latency reduction in accordance with various aspects of the present disclosure. Wireless device 1105 may be an example of aspects of a wireless device 1005 or a base station 105 as described with reference to FIGS. 1 and 10. Wireless device 1105 may include receiver 1110, base station timing manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to timing advance reporting for latency reduction, etc.). Information may be passed on to other components of the device. The receiver 1110 may be an example of aspects of the transceiver 1335 described with reference to FIG. 13.

Base station timing manager 1115 may be an example of aspects of the base station timing manager 1315 described with reference to FIG. 13.

Base station timing manager 1115 may also include communication manager 1125 and timing configuration component 1130.

Communication manager 1125 may receive, from a UE, an uplink message that indicates an uplink timing advance for the UE, where the uplink timing advance is based on a distance between the UE and a base station.

Timing configuration component 1130 may determine a timing configuration for the UE based on the uplink timing advance for the UE, set one or more timing advance thresholds for one or more UEs based on capabilities of the one or more UEs, where the timing configuration for the UE is determined based on one or more of the timing advance thresholds, maintain a timing advance history for the UE based on the uplink timing advance, determine the timing configuration is based on the timing advance history, determine a timing advance report periodicity for the UE based on the timing advance history, and modify a reporting parameter for the UE based on the uplink timing advance. In some cases, determining the timing configuration includes setting multiple timing advance thresholds for the UE, where intervals between each of the multiple timing advance thresholds correspond to different timing configurations. In some cases, the modified reporting parameter includes at least one of a TBS limit, a layer constraint, a CSI feedback limit, or a CCs limit, or any combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
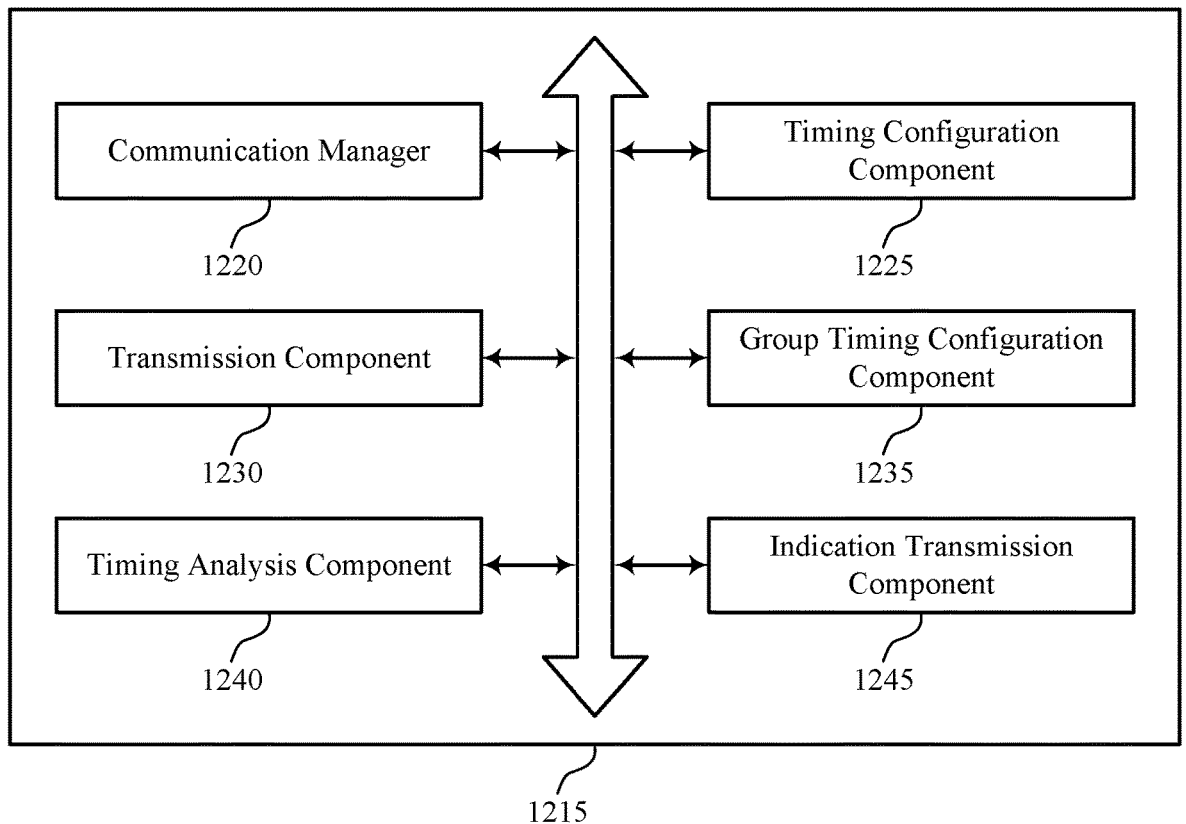

FIG. 12 shows a block diagram 1200 of a base station timing manager 1215 that supports timing advance reporting for latency reduction in accordance with various aspects of the present disclosure. The base station timing manager 1215 may be an example of aspects of a base station timing manager 1315 described with reference to FIGS. 10, 11, and 13. The base station timing manager 1215 may include communication manager 1220, timing configuration component 1225, transmission component 1230, group timing configuration component 1235, timing analysis component 1240, and indication transmission component 1245. Each of these modules may communicate, directly or indirectly, with one another (e.g., via one or more buses).

Communication manager 1220 may receive, from a UE, an uplink message that indicates an uplink timing advance for the UE, where the uplink timing advance is based on a distance between the UE and a base station.

Timing configuration component 1225 may determine a timing configuration for the UE based on the uplink timing advance for the UE, set one or more timing advance thresholds for one or more UEs based on capabilities of the one or more UEs, where the timing configuration for the UE is determined based on one or more of the timing advance thresholds, maintain a timing advance history for the UE based on the uplink timing advance, determine the timing configuration is based on the timing advance history, determine a timing advance report periodicity for the UE based on the timing advance history, and modify a reporting parameter for the UE based on the uplink timing advance. In some cases, determining the timing configuration includes setting multiple timing advance thresholds for the UE, where intervals between each of the multiple timing advance thresholds correspond to different timing configurations. In some cases, the modified reporting parameter includes at least one of a TBS limit, a layer constraint, a CSI feedback limit, or a CCs limit, or any combination thereof.

Transmission component 1230 may transmit an indication of the timing configuration to the UE in response to receiving the uplink message, transmit the timing advance report periodicity to the UE, and transmit the modified reporting parameter to the UE.

Group timing configuration component 1235 may determine timing for one or more TAGs. In some cases, the uplink message includes one of a set of uplink messages, where each uplink message of the set of uplink messages indicates a timing advance for at least one of multiple TAGs. In some cases, determining the timing configuration includes determining the timing configuration for one or more of the multiple TAGs based on the indicated timing advance.

Timing analysis component 1240 may determine that the uplink timing advance exceeds a threshold, where the timing configuration is determined based on the determination that the uplink timing advance exceeds the threshold and determine that the uplink timing advance has a value within a range of a maximum uplink timing advance value, where the timing configuration is determined based on the determination that the uplink timing advance has the value within the range. In some cases, determining that the uplink timing advance has a value within the range includes identifying one or more intervals that represent an uplink timing advance value relative to the maximum uplink timing advance value, where the uplink message indicates at least one of the one or more intervals. In some cases, each of the one or more intervals has a same duration. In some cases, the one or more intervals have different durations. In some cases, the one or more intervals are UE-specific.

Indication transmission component 1245 may transmit an indication of the one or more intervals from the base station, where the indication is UE-specific.

Figure 13:
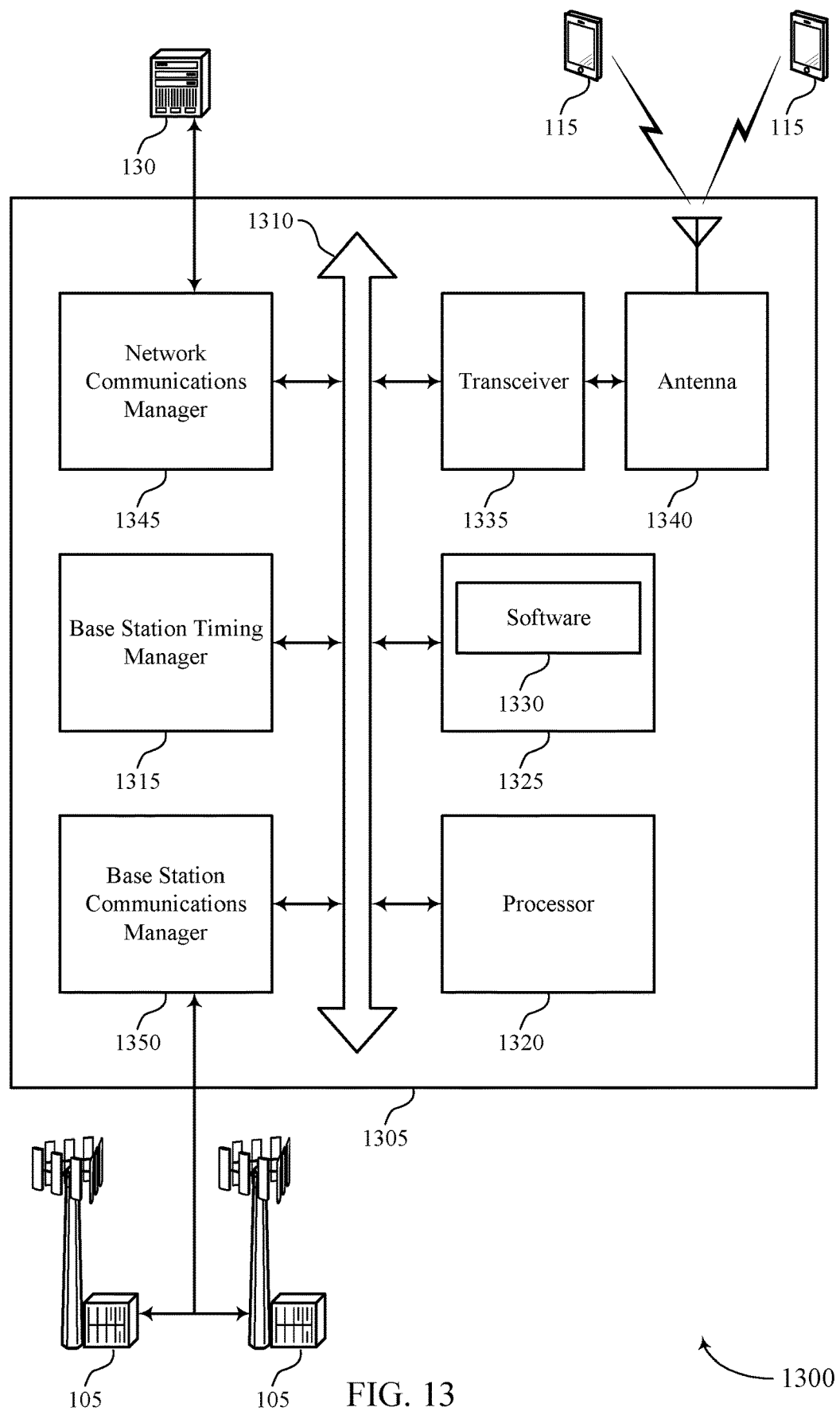
FIG. 13 illustrates a block diagram of a system including a base station that supports timing advance reporting for latency reduction in accordance with aspects of the present disclosure.

FIG. 13 shows a diagram of a system 1300 including a device 1305 that supports timing advance reporting for latency reduction in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station timing manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting timing advance reporting for latency reduction).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support timing advance reporting for latency reduction. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
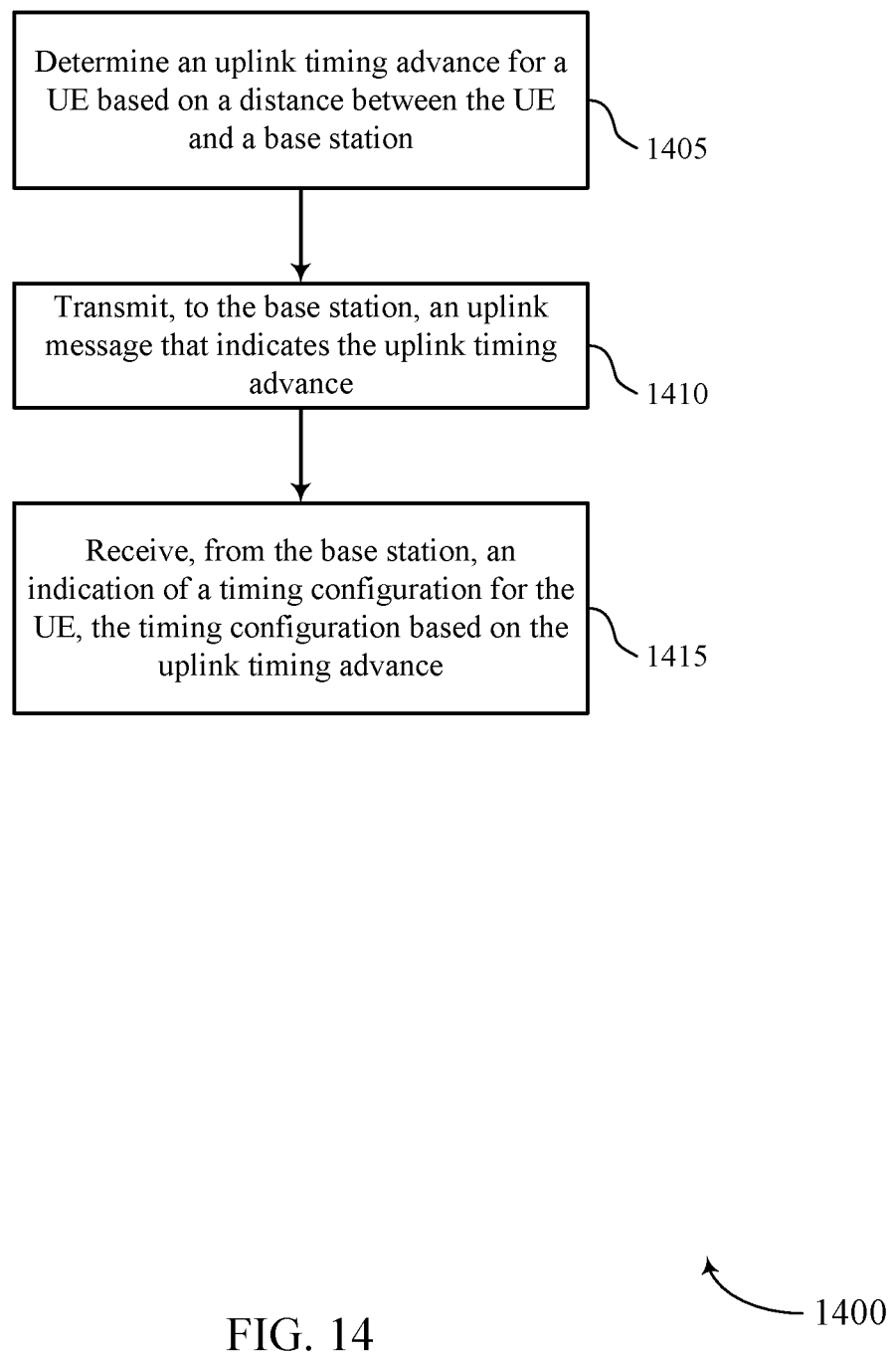
FIGS. 14 through 17 illustrate methods for timing advance reporting for latency reduction in accordance with aspects of the present disclosure.

FIG. 14 shows a flowchart illustrating a method 1400 for timing advance reporting for latency reduction in accordance with various aspects of the present disclosure. The operations of method 1400 may be implemented by a UE 115 or its components as described herein. For example, the operations of method 1400 may be performed by a UE timing manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1405 the UE 115 may determine an uplink timing advance for a UE based on a distance between the UE and a base station. The operations of block 1405 may be performed according to the methods described with reference to FIGS. 1 through 5. In certain examples, aspects of the operations of block 1405 may be performed by a UE communication manager as described with reference to FIGS. 6 through 9.

At block 1410 the UE 115 may transmit, to the base station, an uplink message that indicates the uplink timing advance. The operations of block 1410 may be performed according to the methods described with reference to FIGS. 1 through 5. In certain examples, aspects of the operations of block 1410 may be performed by a transmitting component as described with reference to FIGS. 6 through 9.

At block 1415 the UE 115 may receive, from the base station, an indication of a timing configuration for the UE, the timing configuration based on the uplink timing advance. The operations of block 1415 may be performed according to the methods described with reference to FIGS. 1 through 5. In certain examples, aspects of the operations of block 1415 may be performed by a UE reception component as described with reference to FIGS. 6 through 9.

Figure 15:
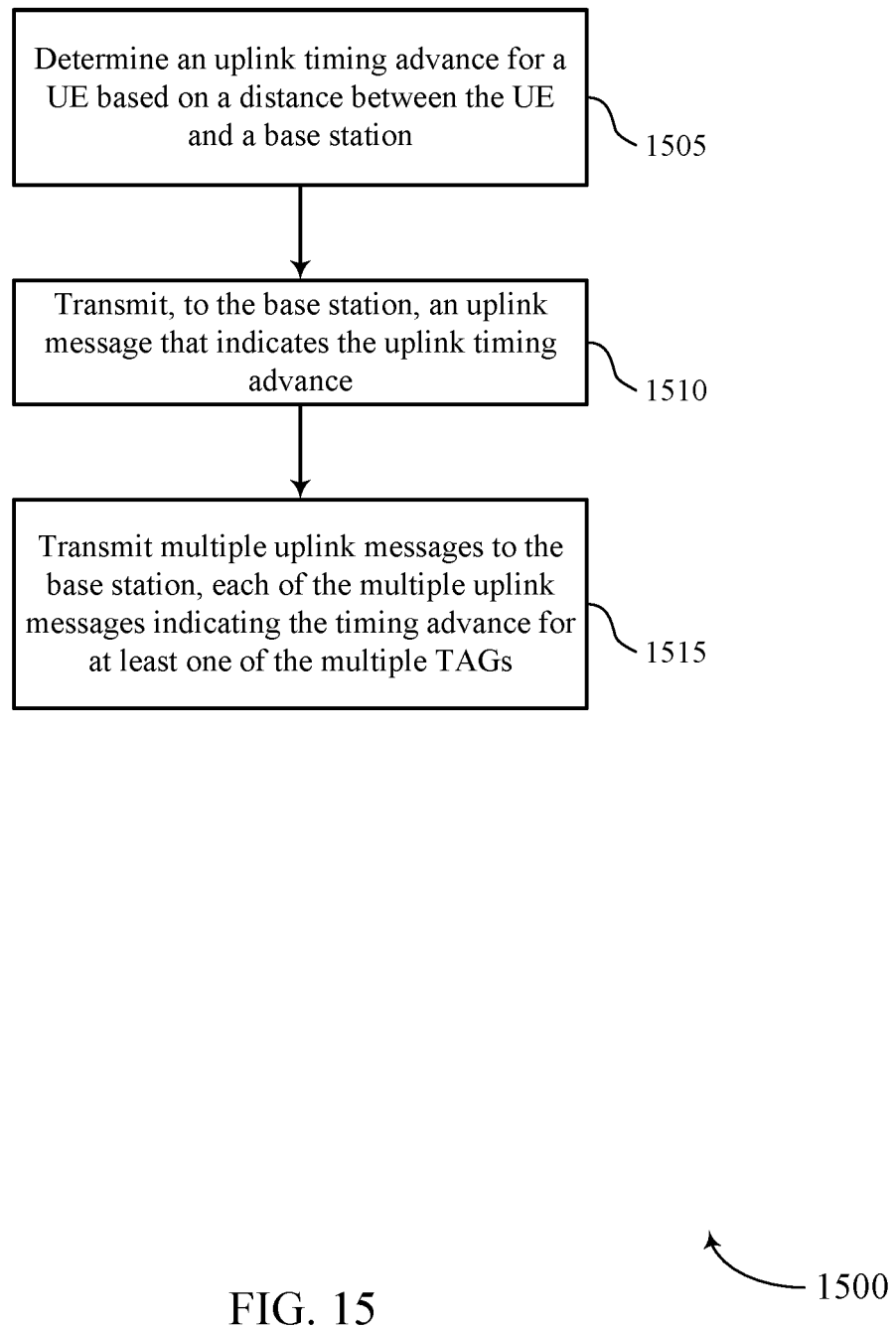

FIG. 15 shows a flowchart illustrating a method 1500 for timing advance reporting for latency reduction in accordance with various aspects of the present disclosure. The operations of method 1500 may be implemented by a UE 115 or its components as described herein. For example, the operations of method 1500 may be performed by a UE timing manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may determine an uplink timing advance for a UE based on a distance between the UE and a base station. The operations of block 1505 may be performed according to the methods described with reference to FIGS. 1 through 5. In certain examples, aspects of the operations of block 1505 may be performed by a UE communication manager as described with reference to FIGS. 6 through 9.

At block 1510 the UE 115 may transmit, to the base station, an uplink message that indicates the uplink timing advance. The operations of block 1510 may be performed according to the methods described with reference to FIGS. 1 through 5. In certain examples, aspects of the operations of block 1510 may be performed by a transmitting component as described with reference to FIGS. 6 through 9.

At block 1515 the UE 115 may transmit multiple uplink messages to the base station, each of the multiple uplink messages indicating the timing advance for at least one of the multiple TAGs. The operations of block 1515 may be performed according to the methods described with reference to FIGS. 1 through 5. In certain examples, aspects of the operations of block 1515 may be performed by a transmitting component as described with reference to FIGS. 6 through 9.

In some cases, determining the uplink timing advance includes determining a timing advance for each of multiple TAGs.

Figure 16:
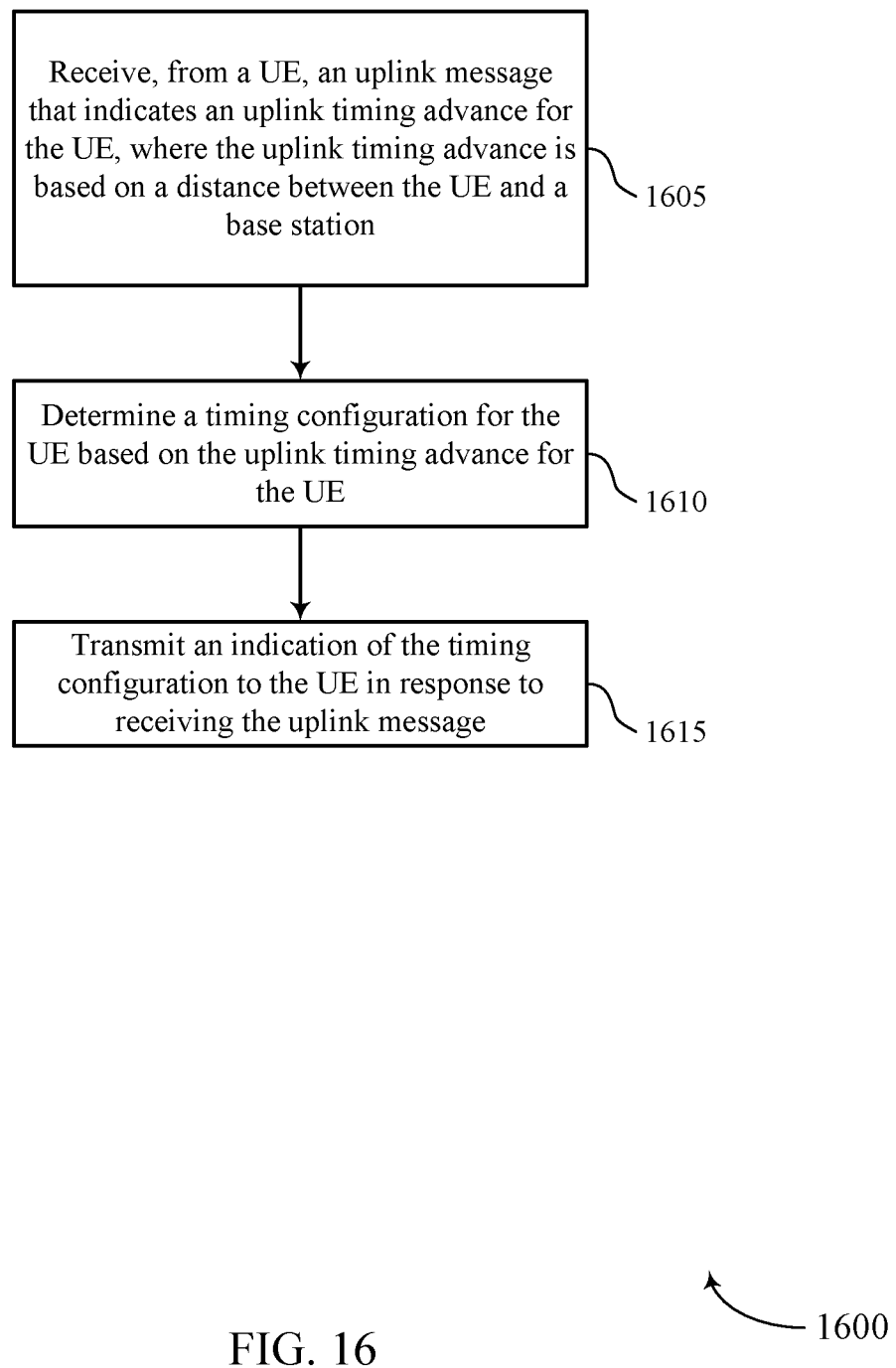

FIG. 16 shows a flowchart illustrating a method 1600 for timing advance reporting for latency reduction in accordance with various aspects of the present disclosure. The operations of method 1600 may be implemented by a base station 105 or its components as described herein. For example, the operations of method 1600 may be performed by a base station timing manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may receive, from a UE, an uplink message that indicates an uplink timing advance for the UE, where the uplink timing advance is based on a distance between the UE and a base station. The operations of block 1605 may be performed according to the methods described with reference to FIGS. 1 through 5. In certain examples, aspects of the operations of block 1605 may be performed by a communication manager as described with reference to FIGS. 10 through 13.

At block 1610 the base station 105 may determine a timing configuration for the UE based on the uplink timing advance for the UE. The operations of block 1610 may be performed according to the methods described with reference to FIGS. 1 through 5. In certain examples, aspects of the operations of block 1610 may be performed by a timing configuration component as described with reference to FIGS. 10 through 13.

At block 1615 the base station 105 may transmit an indication of the timing configuration to the UE in response to receiving the uplink message. The operations of block 1615 may be performed according to the methods described with reference to FIGS. 1 through 5. In certain examples, aspects of the operations of block 1615 may be performed by a transmission component as described with reference to FIGS. 10 through 13.

Figure 17:
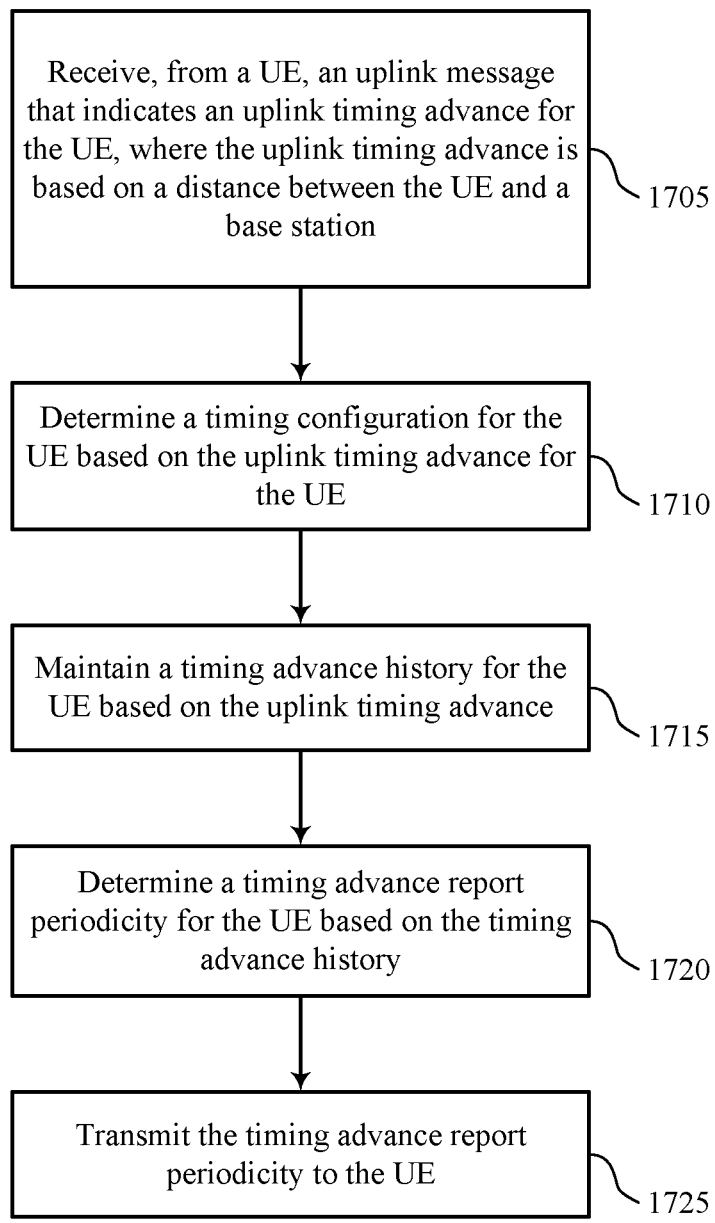

FIG. 17 shows a flowchart illustrating a method 1700 for timing advance reporting for latency reduction in accordance with various aspects of the present disclosure. The operations of method 1700 may be implemented by a base station 105 or its components as described herein. For example, the operations of method 1700 may be performed by a base station timing manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may receive, from a UE, an uplink message that indicates an uplink timing advance for the UE, where the uplink timing advance is based on a distance between the UE and a base station. The operations of block 1705 may be performed according to the methods described with reference to FIGS. 1 through 5. In certain examples, aspects of the operations of block 1705 may be performed by a communication manager as described with reference to FIGS. 10 through 13.

At block 1710 the base station 105 may determine a timing configuration for the UE based on the uplink timing advance for the UE. The operations of block 1710 may be performed according to the methods described with reference to FIGS. 1 through 5. In certain examples, aspects of the operations of block 1710 may be performed by a timing configuration component as described with reference to FIGS. 10 through 13.

At block 1715 the base station 105 may maintain a timing advance history for the UE based on the uplink timing advance. The operations of block 1715 may be performed according to the methods described with reference to FIGS. 1 through 5. In certain examples, aspects of the operations of block 1715 may be performed by a timing configuration component as described with reference to FIGS. 10 through 13.

At block 1720 the base station 105 may determine a timing advance report periodicity for the UE based on the timing advance history. The operations of block 1720 may be performed according to the methods described with reference to FIGS. 1 through 5. In certain examples, aspects of the operations of block 1720 may be performed by a timing configuration component as described with reference to FIGS. 10 through 13.

At block 1725 the base station 105 may transmit the timing advance report periodicity to the UE. The operations of block 1725 may be performed according to the methods described with reference to FIGS. 1 through 5. In certain examples, aspects of the operations of block 1725 may be performed by a transmission component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). "3rd Generation Partnership Project" (3GPP) LTE and LTE-A are releases of UMTS that use E-UTRA. UTRA, E-UTRA, UMTS, LTE, LTE-A, NR, and GSM are described in documents from the organization named "3GPP. CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (base station) may be generally used to describe the base stations. The wireless communications system or systems described herein may include a heterogeneous LTE/LTE-A or NR network in which different types of evolved node B (eNBs) provide coverage for various geographical regions. For example, each base station, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro base stations, small cell base stations, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An base station for a macro cell may be referred to as a macro base station. An base station for a small cell may be referred to as a small cell base station, a pico base station, a femto base station, or a home base station. An base station may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining an uplink timing advance for a user equipment (UE) based at least in part on a distance between the UE and a base station;
   determining the uplink timing advance is within a range relative to a timing advance threshold;
   mapping, based at least in part on determining that the uplink timing advance is in the range, the uplink timing advance to an interval of one or more intervals within the range, wherein each of the one or more intervals spans a respective time period relative to the timing advance threshold; and
   transmitting, to the base station, an uplink message that indicates that a value of the uplink timing advance is within the range relative to the timing advance threshold based at least in part on mapping the uplink timing advance to the interval, wherein the uplink message indicates the interval and excludes the value of the uplink timing advance.

2. The method of claim 1, wherein the timing advance threshold is a maximum uplink timing advance value.

3. The method of claim 2, wherein determining that the uplink timing advance is within the range comprises:
   identifying the one or more intervals that represent an uplink timing advance value relative to the maximum uplink timing advance value.

4. The method of claim 3, further comprising:
   receiving an indication of the one or more intervals from the base station, wherein the indication is UE-specific.

5. The method of claim 3, wherein the one or more intervals are UE-specific.

6. The method of claim 1, wherein transmitting the uplink message comprises:
   periodically transmitting the uplink message.

7. The method of claim 1, further comprising:
receiving, from the base station, an indication of a timing configuration for the UE, the timing configuration based at least in part on the uplink timing advance.

8. The method of claim 7, wherein the indication of the timing configuration comprises at least one of a transport block size (TBS) limit, a layer constraint, a channel state information (CSI) feedback limit, or a component carrier (CC) limit, or any combination thereof.

9. The method of claim 1, wherein:
determining the uplink timing advance comprises: determining a timing advance for each of multiple timing advance groups (TAGs), wherein the uplink message indicates the timing advance for at least one of the multiple TAGs; and
transmitting the uplink message comprises: transmitting multiple uplink messages to the base station, each of the multiple uplink messages indicating the timing advance for at least one of the multiple TAGs.

10. The method of claim 1, further comprising:
determining that the uplink timing advance falls outside the range relative to the timing advance threshold; and
refraining from transmitting timing advance feedback to the base station based at least in part on the determining that the uplink timing advance has fallen outside the range relative to the timing advance threshold.

11. An apparatus for wireless communication, in a system comprising:
a processor;
memory in electronic communication with the processor; and
instructions stored in the memory and operable, when executed by the processor, to cause the apparatus to:
receive, from a user equipment (UE), an uplink message that indicates an uplink timing advance for the UE, the uplink message excluding a value of the uplink timing advance and indicating an interval of one or more intervals within a range relative to a timing advance threshold, wherein the uplink timing advance is based at least in part on a distance between the UE and a base station;
determine the uplink timing advance is within the range relative to the timing advance threshold based at least in part on the interval included in the uplink message; and
determine a timing configuration for the UE based at least in part on the uplink timing advance for the UE and the determination that the uplink timing advance is within the range relative to the timing advance threshold.

12. The method of claim 11, wherein the set of one or more intervals includes at least two intervals each spanning a timing advance range less than a maximum uplink timing advance value.

13. The method of claim 12, wherein the set of one or more intervals further includes one or more intervals each spanning a timing advance range greater than the maximum uplink timing advance value.

14. A method for wireless communication, comprising:
receiving, from a user equipment (UE), an uplink message that indicates an uplink timing advance for the UE, the uplink message excluding a value of the uplink timing advance and indicating an interval of one or more intervals within a range relative to a timing advance threshold, wherein the uplink timing advance is based at least in part on a distance between the UE and a base station;
determining the uplink timing advance is within the range relative to the timing advance threshold based at least in part on the interval included in the uplink message; and
determining a timing configuration for the UE based at least in part on the uplink timing advance for the UE and the determination that the uplink timing advance is within the range relative to the timing advance threshold.

15. The method of claim 14, further comprising:
transmitting an indication of the timing configuration to the UE in response to receiving the uplink message.

16. The method of claim 14, wherein the uplink message comprises one of a set of uplink messages, wherein each uplink message of the set of uplink messages indicates a timing advance for at least one of multiple timing advance groups (TAGs).

17. The method of claim 16, wherein determining the timing configuration comprises:
determining the timing configuration for one or more of the multiple TAGs based at least in part on the indicated uplink timing advance.

18. The method of claim 14, wherein the timing advance threshold is a maximum uplink timing advance value.

19. The method of claim 18, wherein determining that the uplink timing advance is within the range comprises:
identifying the one or more intervals that represent an uplink timing advance value relative to the maximum uplink timing advance value.

20. The method of claim 18, further comprising:
transmitting an indication of the one or more intervals to the UE, wherein the indication is UE-specific.

21. The method of claim 18, wherein the one or more intervals are UE-specific.

22. The method of claim 14, further comprising:
setting one or more timing advance thresholds for one or more UEs based at least in part on capabilities of the one or more UEs, wherein the timing configuration for the UE is determined based at least in part on the one or more of the timing advance thresholds.

23. The method of claim 14, wherein determining the timing configuration comprises:
setting multiple timing advance thresholds for the UE, wherein intervals between each of the multiple timing advance thresholds correspond to different timing configurations.

24. The method of claim 14, further comprising:
maintaining a timing advance history for the UE based at least in part on the uplink timing advance.

25. The method of claim 24, further comprising:
determining the timing configuration based at least in part on the timing advance history.

26. The method of claim 24, further comprising:
determining a timing advance report periodicity for the UE based at least in part on the timing advance history.

27. The method of claim 26, further comprising:
transmitting the timing advance report periodicity to the UE.

28. The method of claim 14, further comprising:
modifying a reporting parameter for the UE based at least in part on the uplink timing advance; and
transmitting the modified reporting parameter to the UE.

29. The method of claim 28, wherein the modified reporting parameter comprises at least one of a transport block size (TBS) limit, a layer constraint, a channel state information (CSI) feedback limit, or a component carrier (CC) limit, or any combination thereof.

30. An apparatus for wireless communication, in a system comprising:
a processor;
memory in electronic communication with the processor; and
instructions stored in the memory and operable, when executed by the processor, to cause the apparatus to:
determine an uplink timing advance for a user equipment (UE) based at least in part on a distance between the UE and a base station;
determine the uplink timing advance is within a range relative to a timing advance threshold;
map, based at least in part on determining that the uplink timing advance is in the range, the uplink timing advance to an interval of one or more intervals within the range, wherein each of the one or more intervals spans a respective time period relative to the timing advance threshold; and
transmit, to the base station, an uplink message that indicates that a value of the uplink timing advance is within the range relative to the timing advance threshold based at least in part on mapping the uplink timing advance to the interval, wherein the uplink message indicates the interval and excludes the value of the uplink timing advance.

31. The apparatus of claim 30, wherein the timing advance threshold is a maximum uplink timing advance value.

32. The method of claim 11, wherein the interval relative to the timing advance threshold is an interval spanning timing advance values less than a maximum uplink timing advance value.

* * * * *